United States Patent
Park et al.

(10) Patent No.: US 10,754,509 B2
(45) Date of Patent: Aug. 25, 2020

(54) METHOD FOR DISPLAYING APPLICATION AND ELECTRONIC DEVICE FOR THE SAME

(71) Applicant: Samsung Electronics Co., Ltd., Gyeonggi-do (KR)

(72) Inventors: Soo-Pyoung Park, Gyeonggi-do (KR); Jaeil Joo, Gyeonggi-do (KR); Kyung-Hee Lee, Seoul (KR); Juyeong Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 161 days.

(21) Appl. No.: 15/487,049

(22) Filed: Apr. 13, 2017

(65) Prior Publication Data
US 2017/0329475 A1    Nov. 16, 2017

(30) Foreign Application Priority Data
May 16, 2016    (KR) .................. 10-2016-0059567

(51) Int. Cl.
*G06F 3/0483*    (2013.01)
*G06F 3/0482*    (2013.01)
(Continued)

(52) U.S. Cl.
CPC .......... *G06F 3/0483* (2013.01); *G06F 3/0482* (2013.01); *G06F 3/0486* (2013.01);
(Continued)

(58) Field of Classification Search
CPC .................................................. G06F 3/0483
(Continued)

(56) References Cited

U.S. PATENT DOCUMENTS

2010/0211872 A1    8/2010  Rolston et al.
2011/0296351 A1*  12/2011  Ewing, Jr. ............. G06F 3/0346
                                                            715/841

(Continued)

FOREIGN PATENT DOCUMENTS

EP      3 012 732        4/2016
WO   WO 2006/092464     9/2006

OTHER PUBLICATIONS

European Search Report dated Oct. 17, 2017 issued in counterpart application No. 17169094.4-1879, 5 pages.

(Continued)

*Primary Examiner* — Nicholas McFall
*Assistant Examiner* — Terri L Filosi
(74) *Attorney, Agent, or Firm* — The Farrell Law Firm, P.C.

(57) ABSTRACT

An electronic device and method are provided. The electronic device includes a display, a processor electrically connected with the display, and a memory electrically connected with the processor. The memory stores instructions that when executed cause the processor to display a plurality of objects for executing at least one application, wherein each of the plurality of objects has a second form corresponding to a first form of the display and has at least a part thereof overlapping with another object. The instructions, when executed, cause the processor to display an execution screen of an application corresponding to an object which is selected from among the plurality of objects in response to an input.

11 Claims, 24 Drawing Sheets

(51) Int. Cl.
*G06F 3/0484* (2013.01)
*H04M 1/725* (2006.01)
*G06F 3/0486* (2013.01)
*G06F 3/0488* (2013.01)

(52) U.S. Cl.
CPC ........ *G06F 3/0488* (2013.01); *G06F 3/04842* (2013.01); *H04M 1/72519* (2013.01)

(58) Field of Classification Search
USPC ..................................................... 715/769
See application file for complete search history.

(56) References Cited

U.S. PATENT DOCUMENTS

| | | |
|---|---|---|
| 2014/0195890 A1 | 7/2014 | Taylor et al. |
| 2014/0215380 A1 | 7/2014 | Kang et al. |
| 2015/0033184 A1* | 1/2015 | Kim ..................... G06F 3/0482 715/808 |
| 2015/0268811 A1* | 9/2015 | Min ..................... G06F 3/0488 715/765 |
| 2016/0054867 A1 | 2/2016 | Lee et al. |
| 2016/0055160 A1 | 2/2016 | Himel et al. |
| 2016/0124595 A1 | 5/2016 | Kim et al. |
| 2016/0349961 A1* | 12/2016 | Feng .................. G06F 3/04817 |

OTHER PUBLICATIONS

European Search Report dated Jul. 18, 2019 issued in counterpart application No. 17169094.4-1221, 6 pages.

* cited by examiner

971

972

973

974

975

976

1350

1355

1360

1365

METHOD FOR DISPLAYING APPLICATION AND ELECTRONIC DEVICE FOR THE SAME

PRIORITY

This application claims priority under 35 U.S.C. § 119(a) to Korean Patent Application Serial No. 10-2016-0059567, which was filed in the Korean Intellectual Property Office on May 16, 2016, the content of which is incorporated herein by reference.

BACKGROUND

1. Field of the Disclosure

The present disclosure generally relates to a method and an apparatus for displaying an application.

2. Description of the Related Art

With the recent enhancement of digital technology, various types of electronic devices, such as mobile communication terminals, personal digital assistants (PDAs), electronic schedulers, smart phones, tablet personal computers (PCs), wearable devices, and the like, are widely used. Such electronic devices are provided with various functions such as a voice call, sending a message like a short message service (SMS)/multimedia message service (MMS), a video call, an electronic scheduler, photography, emailing, replaying a broadcast, Internet access, playing music, schedule management, a social networking service (SNS), a messenger, a dictionary, a game, and the like.

Such an electronic device may display one or more applications installed therein on its home screen. An icon (or an image) corresponding to the application may be displayed and other applications related to the application, or having a linkage with the application, may be displayed one by one for each application. In addition, when more than a predetermined number of applications are installed in the electronic device, the electronic device may display a plurality of home screens. In this case, a user may have difficulty in finding which of the plurality of home screens displays a desired application.

When a user does not directly determine display positions of interrelated applications, related-art methods do not display the interrelated applications by relating them to one another. For example, in order to use a second application while using a first application, a user returns to a home screen from the first application and finds and executes the second application. When the user does not know the display position of the icon corresponding to the second application, the user checks the applications included in the plurality of home screens one by one to find the second application causing inconvenience to the user.

SUMMARY

Accordingly, an aspect of the present disclosure provides a method and an apparatus which displays a plurality of objects for executing applications by overlapping the objects with one another, and displays applications related to one object by binding the applications together.

Another aspect of the present disclosure provides a method and an apparatus which display a plurality of objects of a card shape in a stack structure, and, when an object is selected, execute an application corresponding to the selected object, and display a flip indicator for executing another application on the execution screen of the application.

In accordance with an aspect of the present disclosure, an electronic device is provided which includes a display, a processor electrically connected with the display, and a memory electrically connected with the processor. The memory store instructions that when executed, cause the processor to display a plurality of objects for executing at least one application, wherein each of the plurality of objects has a second form corresponding to a first form of the display and has at least a part thereof overlapping with another object. The instructions, when executed, cause the processor to display an execution screen of an application corresponding to an object which is selected from among the plurality of objects in response to an input.

In accordance with another aspect of the present disclosure, a method for operating an electronic device is provided which includes displaying a plurality of objects in a stack structure, each object for executing at least one application, detecting a user input of selecting one object from among the plurality of objects, executing a first application corresponding to the selected object, displaying a flip indicator on an execution screen of the first application, and, when the flip indicator is selected, executing a second application.

According to various embodiments, a plurality of objects for executing applications may be displayed by overlapping the objects with one another, and applications related to one object may be displayed by binding the applications together.

According to various embodiments, a plurality of objects of a card shape may be displayed in a stack structure, and, when an object is selected, an application corresponding to the selected object may be executed, and a flip indicator for executing another application may be displayed on the execution screen of the application.

According to various embodiments, an application may be easily and rapidly switched to another application having a similar function or to another page related to the application by using a flip indicator, so that user convenience can be enhanced.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
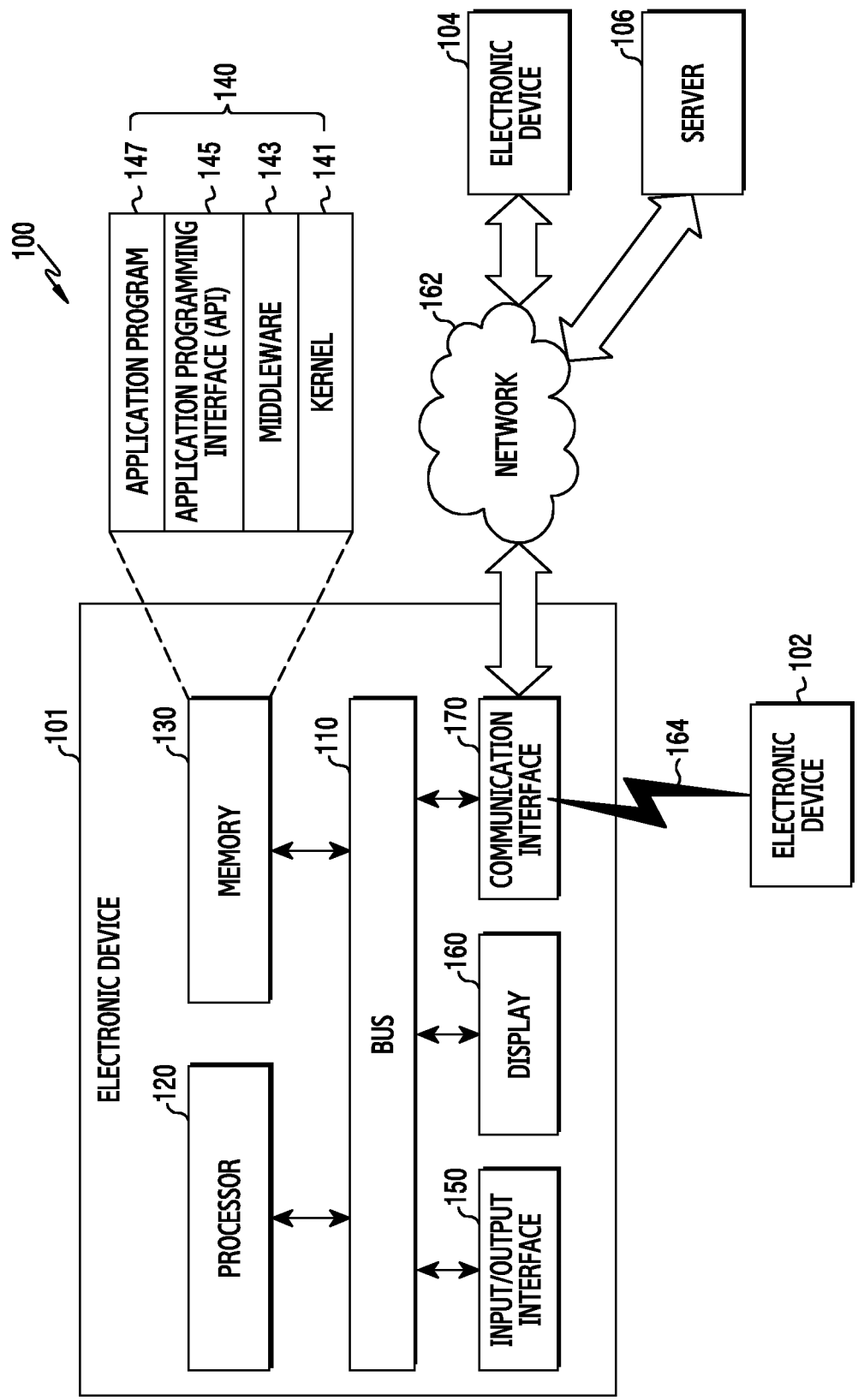
FIG. 1 illustrates an electronic device in a network environment according to an embodiment of the present disclosure.

Hereinafter, various embodiments of the present disclosure will be described with reference to the accompanying drawings. However, it should be understood that there is no limiting the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B. The expressions "a first", "a second", "the first", or "the second" as used in describing various embodiments of the present disclosure may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., a first element) is referred to as being (operatively or communicatively) "connected," or "coupled," to another element (e.g., second element), it may be directly connected or coupled directly to the other element or any other element (e.g., a third element) may be interposed between them. In contrast, it may be understood that when an element (e.g., a first element) is referred to as being "directly connected," or "directly coupled" to another element (a second element), there are no elements (e.g., a third element) interposed between them.

The expression "configured to" as used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller machine (ATM), point of sales (POS) terminal, or Internet of things (IoT) device (e.g., a light bulb, various sensors, electric or gas meter, a sprinkler device, a fire alarm, a thermostat, a streetlamp, a toaster, a sporting good, a hot water tank, a heater, a boiler, etc.).

According to embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, the electronic device is not limited to the aforementioned devices, and may include a new electronic device according to the development of new technology.

Hereinafter, an electronic device according to an embodiment of the present disclosure will be described with reference to the accompanying drawings. As used herein, the term "user" may indicate a person who uses an electronic device or a device (e.g., an artificial intelligence electronic device) that uses an electronic device.

FIG. 1 illustrates an electronic device in a network environment according to an embodiment of the present disclosure.

An electronic device 101 within a network environment 100, will be described with reference to FIG. 1. The electronic device 101 includes a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101. The processor 120 may display a plurality of objects for executing at least one application on the display 160, wherein each of the plurality of objects has a second form corresponding to a first form of the display and has at least a part thereof overlapping with another object, and display, through the display 160, an execution screen of an application corresponding to an object which is selected from among the plurality of objects in response to an input.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 includes, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the applications 147). Furthermore, the kernel 141 may provide an interface through which the middleware 143, the API 145, or the applications 147 may access the individual components of the electronic device 101 to control or manage the system resources.

The middleware 143, for example, may serve as an intermediary for allowing the API 145 or the applications 147 to communicate with the kernel 141 to exchange data. Also, the middleware 143 may process one or more task requests received from the applications 147 according to priorities thereof. For example, the middleware 143 may assign priorities for using the system resources (e.g., the bus 110, the processor 120, the memory 130, and the like) of the electronic device 101, to at least one of the applications 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and an electronic paper display. The display 160 may display, for example, various types of content (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and a first external electronic device 102, a second external electronic device 104, or a server 106. For example, the communication interface 170 may be connected to a network 162 through wireless or wired communication, and may communicate with the second external electronic device 104 or the server 106. The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164.

The short-range communication 164 may include at least one of, for example, wireless fidelity (Wi-Fi), Bluetooth™, near field communication (NFC), and global navigation satellite system (GNSS). GNSS may include, for example, at least one of global positioning system (GPS), global navigation satellite system (Glonass), Beidou navigation satellite system (Beidou) or Galileo, and the European global satellite-based navigation system, based on a location, a bandwidth, and the like. Hereinafter, in the present disclosure, the term "GPS" may be interchangeably used with the term "GNSS". The wired communication may include, for example, at least one of a universal serial bus (USB), a high definition multimedia interface (HDMI), recommended standard 232 (RS-232), and a plain old telephone service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. All or some of the operations performed in the electronic device 101 may be executed in another electronic device or the electronic devices 102 and 104 or the server 106. When the electronic device 101 has to perform some functions or services automatically or in response to a request, the electronic device 101 may request the electronic device 102 or 104 or the server 106 to execute at least some functions relating thereto instead of or in addition to autonomously performing the functions or services. The electronic device 102 or 104, or the server 106 may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
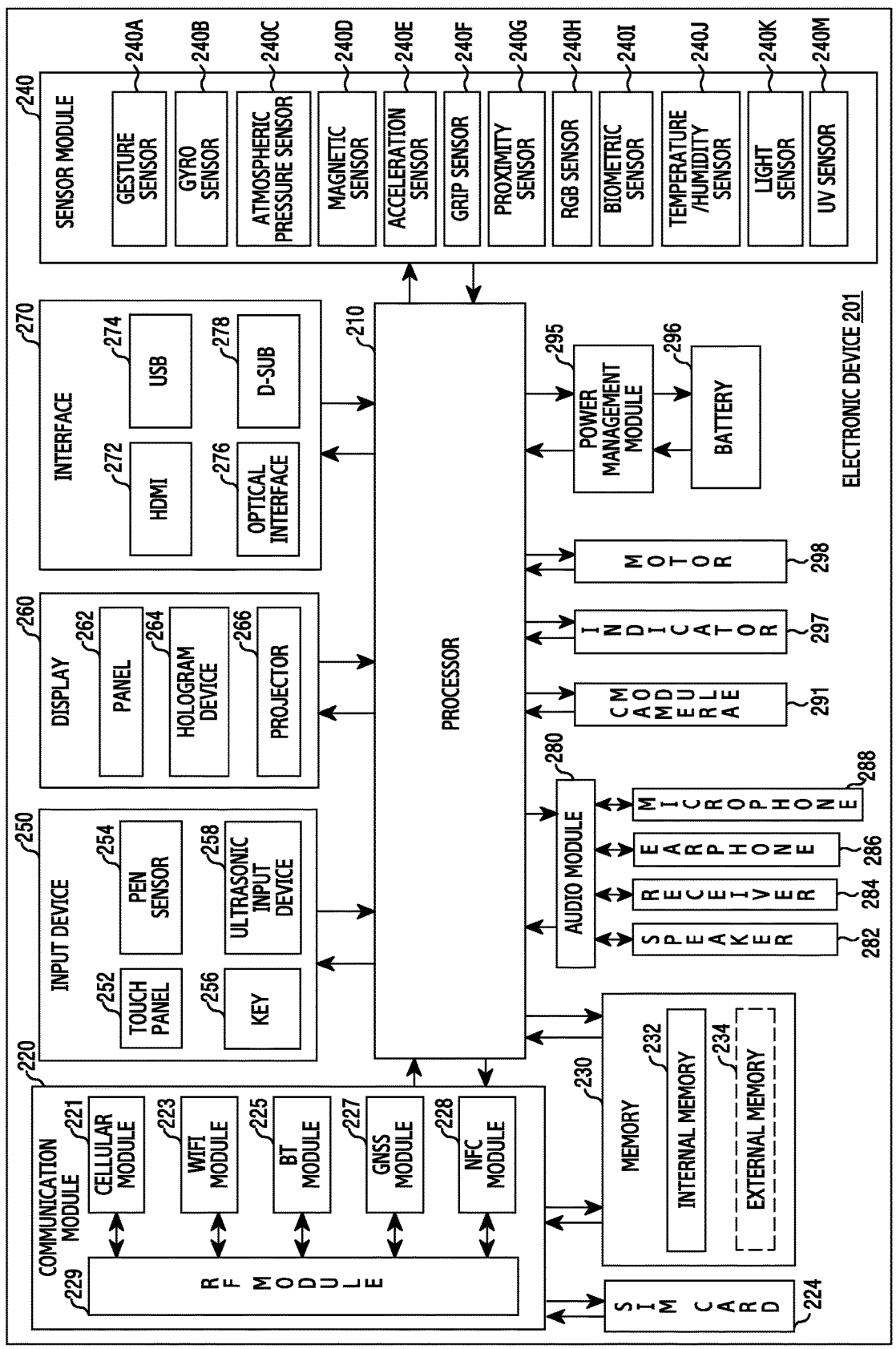
FIG. 2 is a block diagram of an electronic device according to an embodiment of the present disclosure.

FIG. 2 is a block diagram of an electronic device according to an embodiment of the present disclosure.

The electronic device 201 may include, for example, all or a part of the electronic device 101 shown in FIG. 1. The electronic device 201 includes one or more processors 210 (e.g., application processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a system on chip (SoC). According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a BT module 225, a GNSS module 227 (e.g., a GPS module, a Glonass module, a Beidou module, or a Galileo module), an NFC module 228, and a radio frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (SIM) card 224. The cellular module 221 may perform at least some of the functions that the AP 210 may provide. The cellular module 221 may include a communication processor (CP).

For example, each of the Wi-Fi module 223, the BT module 225, the GNSS module 227, and the NFC module 228 may include a processor for processing data transmitted/received through a corresponding module. At least some (e.g., two or more) of the cellular module 221, the Wi-Fi module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. At least one of the cellular module 221, the Wi-Fi module 223, the BT module 225, the GNSS module 227, and the NFC module 228 may transmit/receive an RF signal through a separate RF module.

The SIM car 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) includes, for example, an embedded memory 232 or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OT-PROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an eXtreme Digital (xD), a multimediacard (MMC), a memory stick, and the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 includes, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 includes, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone 288, ultrasonic waves generated by an input tool, and identify data corresponding to the detected ultrasonic waves.

The display 260 (e.g., the display 160) includes a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 includes, for example, a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an image signal processor (ISP) or a flash (e.g., LED or xenon lamp).

The power management module 295 may manage, for example, power of the electronic device 201. According to an embodiment of the present disclosure, the power management module 295 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual charge quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, and the like) of the electronic device 201 or a part (e.g., the processor 210) of the electronic device 201. The motor 298 may convert an electrical signal into a mechanical vibration, and may generate a vibration, a haptic effect, and the like. The electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or MediaFLO™.

Each of the above-described component elements of hardware according to the present disclosure may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
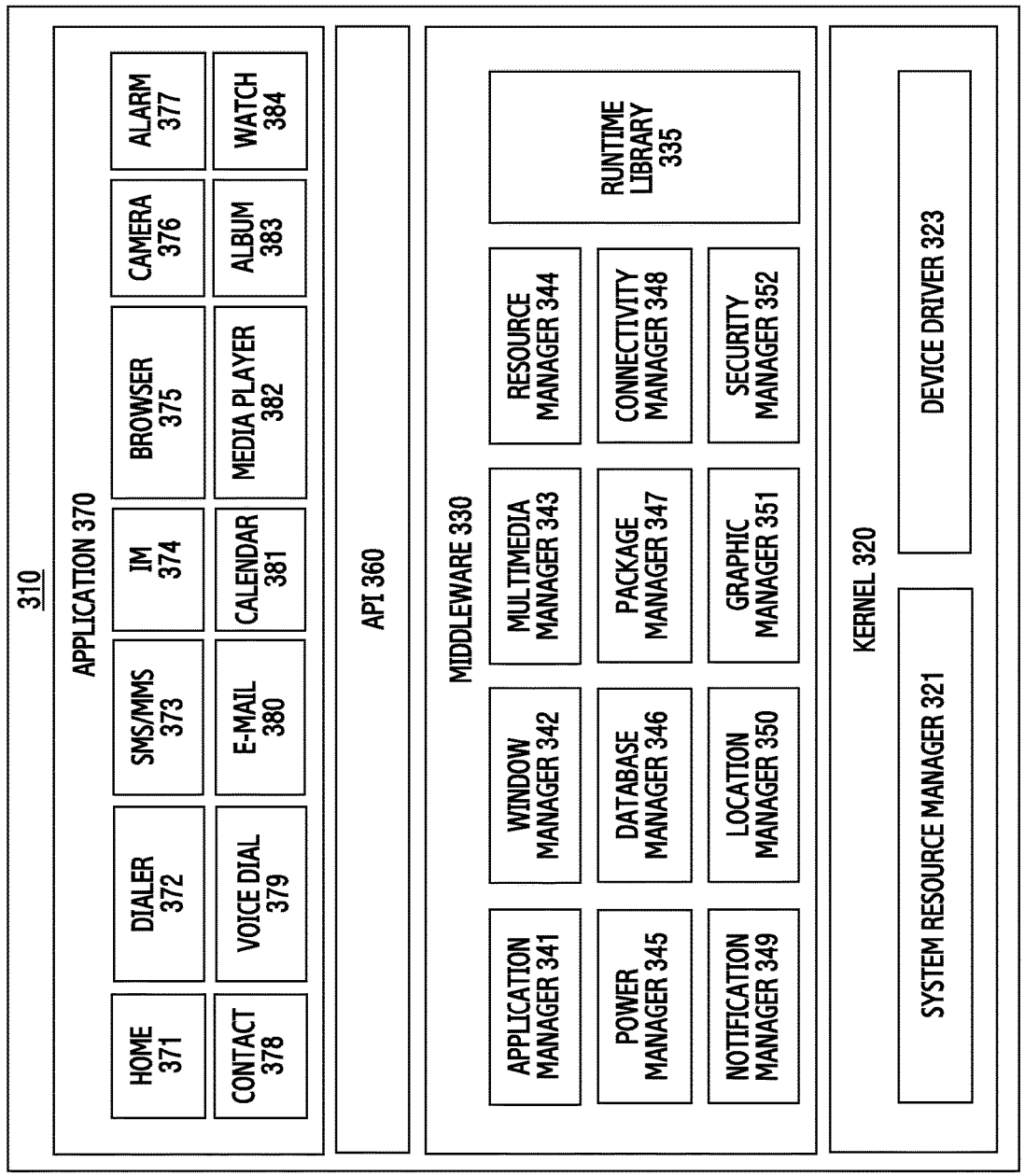
FIG. 3 is a block diagram of a program module according to an embodiment of the present disclosure.

FIG. 3 is a block diagram of a program module according to an embodiment of the present disclosure.

According to an embodiment of the present disclosure, the program module 310 (e.g., the program 140) may include an operating system (OS) for controlling resources related to the electronic device 101 and/or the application programs 147 executed in the operating system. The operating system may be, for example, Android™, iOS™, Windows™, Symbian™, Tizen™, Bada™, and the like.

The program module 310 includes a kernel 320, middleware 330, an API 360, and/or applications 370. At least some of the program module 310 may be preloaded on an electronic device, or may be downloaded from the electronic device 102 or 104, or the server 106.

The kernel 320 (e.g., the kernel 141) includes, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) includes at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, and the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a basic input/output system (BIOS) and the like to manage a battery or power source and may provide power information and the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth™. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, and the like. According to an embodiment of the present disclosure, when the electronic device 101 has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 include, for example, one or more applications which may provide functions such as a home 371, a dialer 372, an SMS/MMS 373, an instant message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar level), or environment information (e.g., providing atmospheric pressure, humidity, or temperature information).

According to an embodiment of the present disclosure, the applications 370 may include an information exchange application that supports exchanging information between the electronic device 101 and the electronic device 102 or 104. The information exchange application may include, for example, a notification relay application for transferring specific information to an external electronic device or a device management application for managing an external electronic device.

For example, the notification relay application may include a function of transferring, to the electronic device 102 or 104, notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of the electronic device 102 or 104 communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance and the like) designated according to attributes of the electronic device 102 or 104. The applications 370 may include an application received from the server 106, or the electronic device 102 or 104. The applications 370 may include a preloaded application or a third party application that may be downloaded from a server. The names of the components of the program module 310 of the illustrated embodiment of the present disclosure may change according to the type of operating system.

According to an embodiment of the present disclosure, at least a part of the programming module 310 may be implemented in software, firmware, hardware, or a combination of two or more thereof. At least some of the program module 310 may be implemented (e.g., executed) by, for example, the processor 210. At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The term "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which are known or are to be developed hereinafter. At least some of the devices (for example, modules or functions thereof) or the method (for example, operations) may be implemented by a command stored in a computer-readable storage medium in a programming module form. The instruction, when executed by a processor 120, may cause the one or more processors to execute the function corresponding to the instruction. The computer-readable recoding media may be, for example, the memory 130.

According to an embodiment of the present disclosure, an electronic device 201 includes a display (for example, the display 160, the display 260), a processor (for example, the processor 120, or the processor 210) electrically connected with the display, and a memory (for example, the memory 130, or the memory 230) electrically connected with the processor. The memory may store instructions that when executed cause the processor to display a plurality of objects for executing at least one application through the display. Each of the plurality of objects may have a second form (for example, a rectangular shape) corresponding to a first form (for example, a rectangular shape) of the display and has at least a part thereof overlapping with another object. The instructions may cause the processor to display, through the display, an execution screen of an application corresponding to an object which is selected from among the plurality of objects in response to an input.

The instructions may cause the processor to display the execution screen through a user interface having the second form (for example, a card shape).

The at least one application may include a first application and a second application, and the instructions may cause the processor to execute at least one of the first application and the second application based on an attribute of the input.

The instructions may cause the processor to switch the execution screen of the application to an execution screen of another application in response to an additional input.

The instructions may cause the processor to switch from the execution screen of the another application to the execution screen of the application in response to an additional input.

The instructions may cause the processor to display a flip indicator on the execution screen of the application to switch to another page.

The instructions may cause the processor to switch to a page of the application which is different from the execution screen, or an execution screen of another application in response to a selection input of the flip indicator.

The another application may be related to the application from among applications installed in the electronic device.

The page of the application may include at least one of a previous page, a next page, a setting page, or an additional function page of the application.

The instructions may cause the processor to execute a second application related to the application in response to a selection input of the flip indicator, or execute a third application based on a use history.

The instructions may cause the processor to display information on one or more applications registered with each object on each object.

The instructions may cause the processor to provide a list including at least one application based on an attribute of the application or a use history when an object registration event is detected.

The instructions may cause the processor to display an application related to the application to be distinguished from other applications when an object registration event is detected.

The instructions may cause the processor to, when a re-position event is detected, display an object of the event detection position to be distinguished, and to move a display position of the object according to a drag input and change the display position of the object based on a position where the drag input is released.

The instructions may cause the processor to change a display position of each object based on a first use history of each object and a second use history of a user in an automatic re-position mode. An electronic device, which will be described hereinafter, may be the electronic device of FIG. 1 or FIG. 2. However, methods will be described as being performed in the electronic device of FIG. 1 for convenience of explanation, but the electronic device is not limited to the electronic device of FIG. 1.

Figure 4:
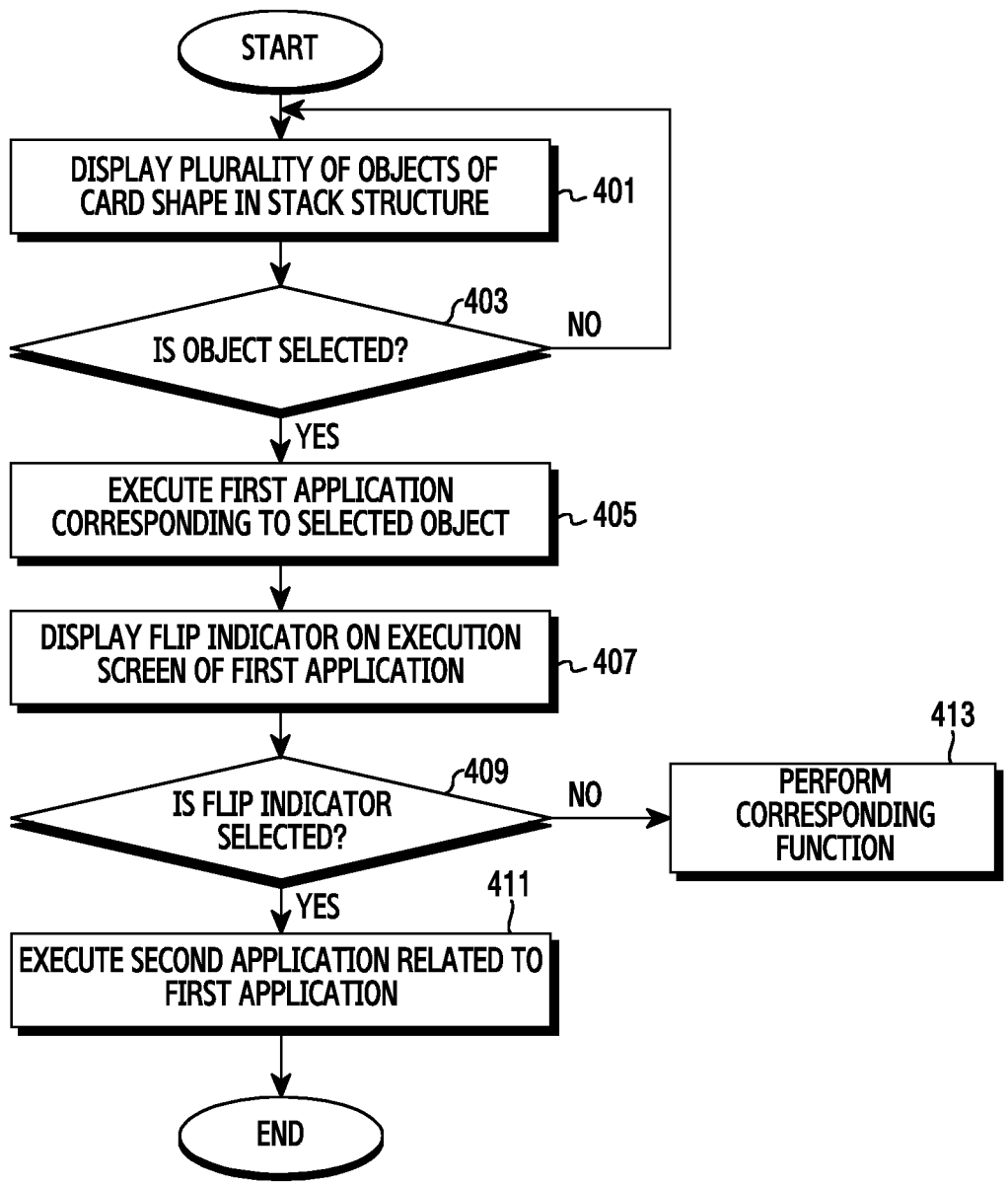
FIG. 4 is a flowchart of a method for displaying an application of an electronic device according to an embodiment of the present disclosure.

FIG. 4 is a flowchart of a method for displaying an application of an electronic device according to an embodiment of the present disclosure.

Referring to FIG. 4, in step 401, the electronic device 101 (for example, the processor 120) may display a plurality of objects of a card shape in a stack structure. For example, each of the objects may be displayed in a card shape (for example, a rectangular shape). The stack structure may refer to a structure in which objects are stacked one upon (over) another. Accordingly, each object may be displayed, having at least a part thereof overlapping with another object. Herein, the object may correspond to an application installed in the electronic device 101. A screen displayed in step 401 may correspond to a home screen of the electronic device 101. The home screen may be a screen which is displayed on the display 160 when nothing is executed in the electronic device 101. The present disclosure may display objects corresponding to applications by overlapping the objects with one another.

According to an embodiment of the present disclosure, one object may correspond to one application or two applications. For example, the embodiment in which one application corresponds to one object may be as shown on a screen 510 of FIG. 5A. In this case, when an object is selected, an application pre-set for the object may be executed. Alternatively, the embodiment in which two applications correspond to one object may be as shown on screens 1110 and 1150 of FIG. 11. In this case, a different application may be executed according to a position where the object is selected (for example, an attribute of a touch input). On the screens 1110 and 1150 of FIG. 11, indicators (for example, icons) corresponding to respective applications may be displayed.

Figure 5A:
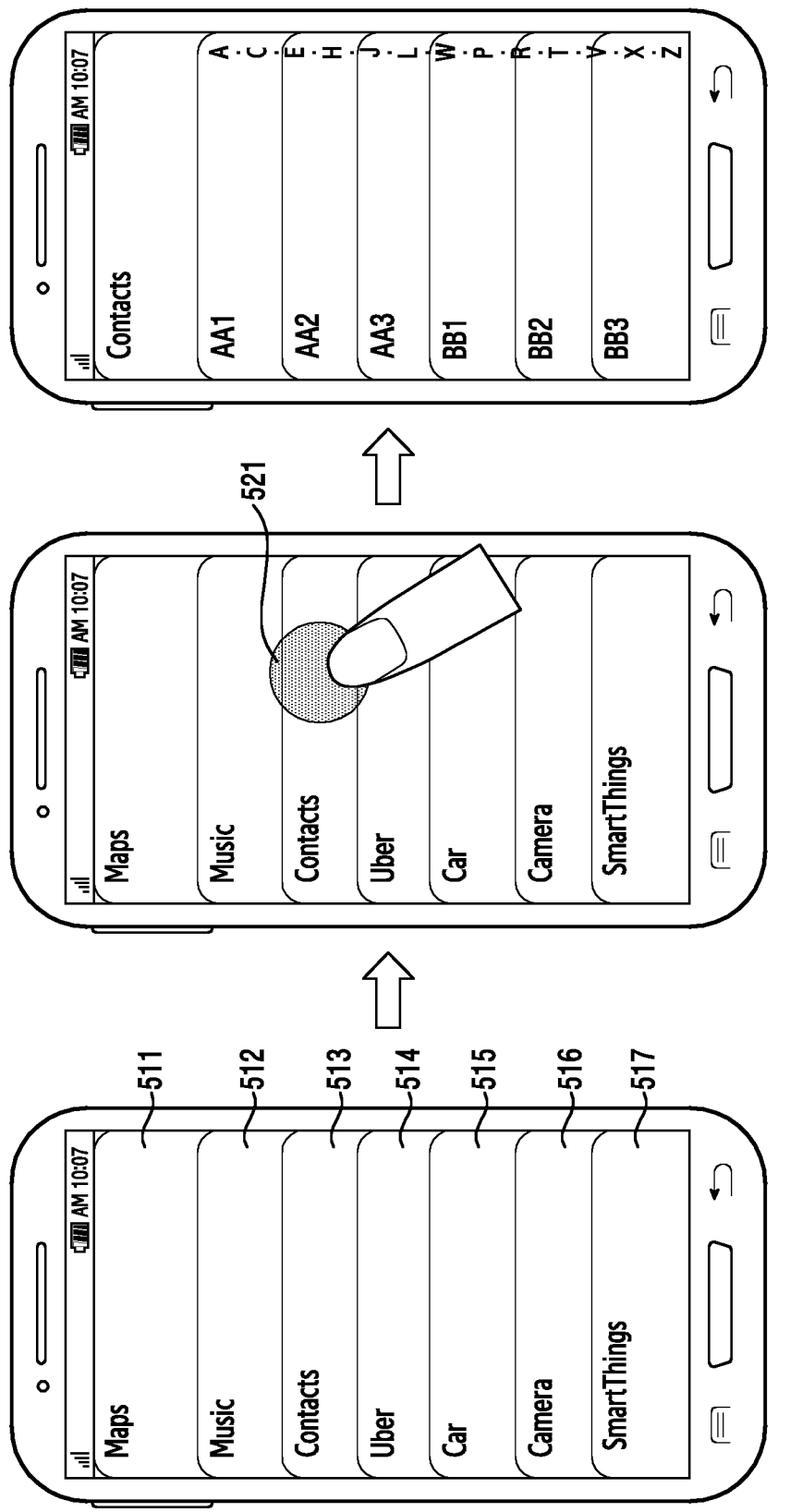
FIG. 5A illustrates screenshots of displaying a plurality of applications according to an embodiment of the present disclosure.

According to an embodiment of the present disclosure, in the case of the screen 510 of FIG. 5A, two applications may be registered to correspond to one object. In this case, when an object is selected, one pre-set application may be executed, and, when a user selects a flip indicator in the screen of the executed application, another application may be executed. That is, when indicators corresponding to applications are not displayed and only one indicator is displayed, a predetermined application may be executed first according to user's settings and another application may be executed according to user's selection.

In step 403, the electronic device 101 (for example, the processor 120) may detect whether an object is selected or not. Selecting the object may be a touch input of touching a position where the object is displayed. The touch input when the object is selected may refer to a single touch, for example, a tap touch. When the object is selected, the processor 120 performs step 405, and, when the object is not selected, the processor 120 returns to step 401.

For example, when an object is not selected and a user input of scrolling objects in the home screen is detected, the processor 120 may display the plurality of objects by moving their display positions in response to the scroll input. For example, the objects displayed on the home screen may be changed according to a user input of scrolling up/down.

When an object is selected (Yes in step 403), the electronic device 101 101 (for example, the processor 120) may execute a first application corresponding to the selected object in step 405. The processor 120 may identify a position where the touch input of selecting the object is detected in order to execute the first application corresponding to the selected object. For example, in the case where one application corresponds to one object, the processor 120 may execute the first application when the touch input occurs in any position where the object is displayed. When two applications correspond to one object and indicators corresponding to the applications are displayed, the processor 120 may identify an indicator on a position where the touch input occurs and may execute the first application corresponding to the identified indicator.

For example, when two indicators are displayed in one object, the object may be divided into two areas (for example, a left area and a right area). When a touch input is detected on the left area with reference to the center of the object, the first application may be executed, and, when a touch input is detected on the right area of the object, a second application may be executed. To the contrary, when a touch input is detected on the left area with reference to the center of the object, the second application may be executed, and, when a touch input is detected on the right area of the object, the first application may be executed.

When the first application is executed, the first application may be displayed on the display 160 of the electronic device 101 and shown to the user. For example, the processor 120 may display an execution screen of the first application over the home screen displayed in step 401 (for example, foreground processing). While the execution screen of the first application is displayed, the home screen may be processed as a background. That is, when the home screen is processed as the background, the home screen may not be shown to the user.

In step 407, the electronic device 101 (for example, the processor 120) displays a flip indicator on the execution screen of the first application. When the first application is executed in step 405, the processor 120 displays the execution screen of the first application. In this case, the processor 120 may display the flip indicator on the execution screen of the first application. The flip indicator may be for executing another application related to the first application or a page related to the first application. For example, the flip indicator may be displayed in the form of an icon and may be for executing another application or another page of the first application without having to return to the home screen in consideration of the user's convenience.

The processor 120 may display the execution screen of the first application in the form of a card. The processor 120 may display the flip indicator on a part of the execution screen of the first application so as not to interfere with the execution screen of the first application. Since the execution screen of the first application is displayed in the form of a card, the flip indicator may be displayed on a part of the execution screen of the first application for indicating the card form.

In step 409, the electronic device 101 (for example, the processor 120) detects whether the flip indicator is selected or not. For example, the processor 120 may determine whether a touch input on the flip indicator is detected or not. When the flip indicator is not selected, the processor 120 performs step 413, and, when the flip indicator is selected, the processor 120 performs step 411.

When the flip indicator is selected (Yes in step 409), the electronic device 101 (for example, the processor 120) executes the second application related to the first application in step 411. For example, in the case where the user registers the second application as an application that the user wishes to execute at the time of executing the first application in advance, the processor 120 may execute the second application when the flip indicator is selected.

According to an embodiment of the present disclosure, the processor 120 may not receive a registration of an application that the user wishes to execute at the time of executing the first application from the user. The processor 120 may collect a use history of the user executing applications (for example, the number of times of using, a period of use, a time of use, and the like) on a real time basis or periodically, and may determine an application to be executed when the flip indicator is selected based on the collected use history. That is, the processor 120 may execute the second application based on the use history when the flip indicator is selected even if the user does not register the second application in advance. For example, in the case where a "calculator" application (for example, the second application) is frequently used by the user while a "household accounts" application (for example, the first application) is being executed, the processor 120 may execute the calculator application when a flip indicator on the execution screen of the household accounts application is selected. Alternatively, when the processor 120 does not receive the registration of the second application from the user in advance, the processor 120 may receive a registration of setting information (for example, an automatic mode) from the user in order to execute the second application.

For example, when the processor 120 does not receive the registration of the second application from the user in advance and the setting information is registered as a "manual mode," the processor 120 may not display the flip indicator. In addition, the processor 120 may display the flip indicator more dimly when the second application is not registered than when the second application is registered. When the flip indicator is dimly displayed and selected, the processor 120 may perform a process (for example, an operation method of FIG. 8) for registering the second application.

When the processor 120 does not receive the registration of the second application from the user in advance and the setting information is registered as an "automatic mode," the processor 120 may display the flip indicator. When the flip indicator is selected, the processor 120 may execute the second application based on the use history of the application. In addition, the processor 120 may display the flip indicator more dimly when the second application is not registered than when the second application is registered. When the flip indicator is dimly displayed and selected, the processor 120 may display a pop-up window including a process item for registering the second application or an execution item for executing the second application based on the use history of the application. According to an embodiment of the present disclosure, when the flip indicator is selected, the processor 120 may display a page related to the first application. The page related to the first application may be a page which is different from the execution screen of the first application displayed in step 407. For example, the processor 120 may display at least one of a previous page, a next page, a setting page, and an additional function page of the first application as the page related to the first application.

When the flip indicator is not selected (No in step 409), the electronic device 101 (for example, the processor 120) performs a corresponding function in step 413. The corresponding function may refer to a function which is performed according to a user input. For example, when a touch input on the first application is received from the user, the processor 120 may perform a function regarding the first application according to the received touch input. Alternatively, when a user input on a home button or a cancel button is received from the user, the processor 120 may return to the home screen. The home screen may be a screen which is displayed in step 401 and may display the plurality of objects of the card shape in the stack structure.

Figure 5B:
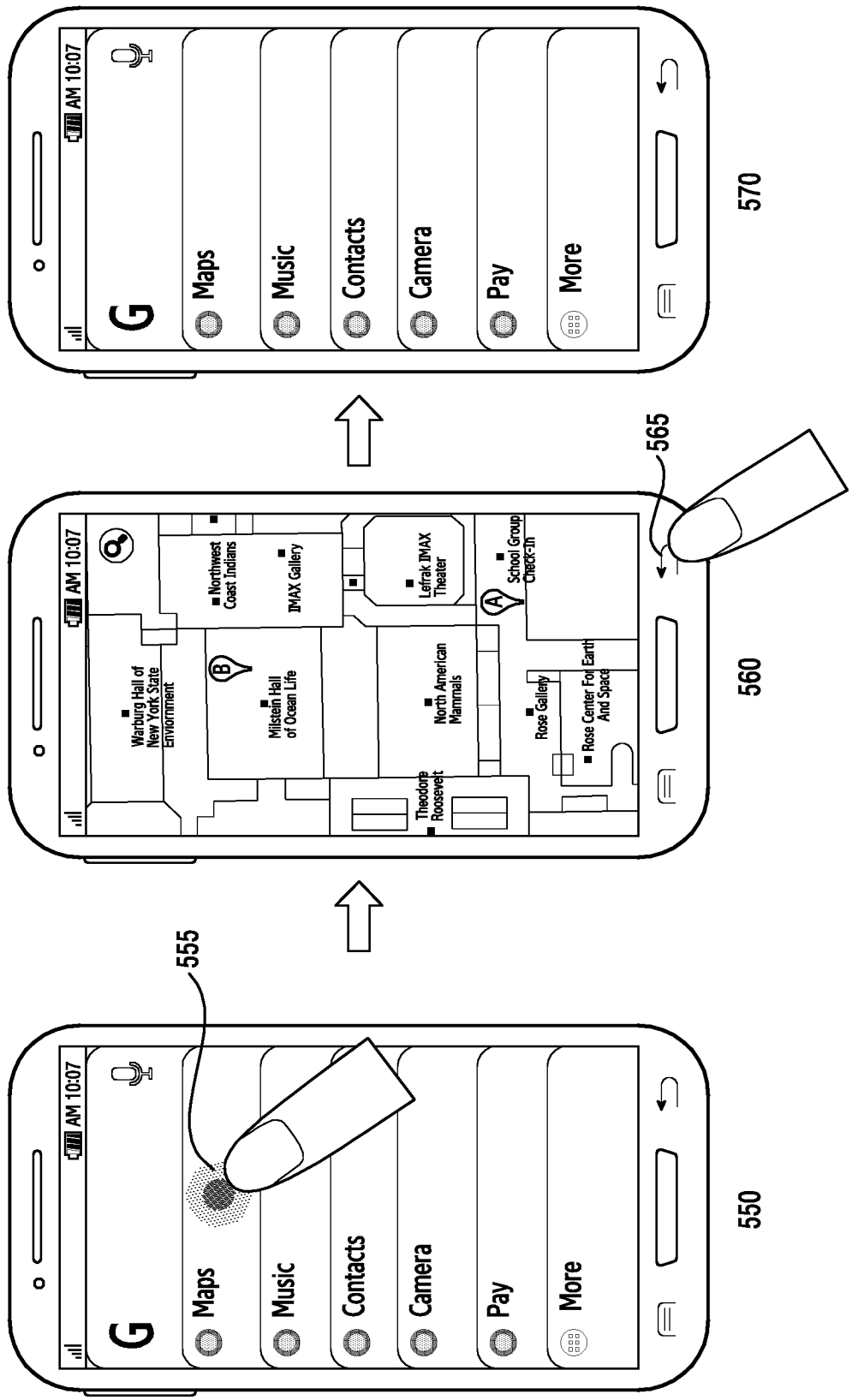
FIG. 5B illustrates switching between a home screen and an application execution screen according to embodiment of the present disclosure.

FIGS. 5A and 5B illustrate displaying a plurality of applications according to an embodiment of the present disclosure.

FIG. 5A illustrates displaying a plurality of objects of a card shape in a stack structure. Referring to FIG. 5A, the first user interface 510 may be a home screen in which a plurality of objects 511-517 of a card shape are displayed in a stack structure. One object may be related to one or two applications. For example, the first user interface 510 includes a first object 511 (Maps), a second object 512 (Music), a third object 513 (Contacts), a fourth object 514 (Uber), a fifth object 515 (Car), a sixth object 516 (Camera), or a seventh object 517 (Smart things).

For example, the first object 511 may be an application related to a map, traffic, route guidance, and the like. The second object 512 may be an application related to music, a video, and the like. The third object 513 may be an application related to contacts, a telephone, a message, and the like. The fourth object 514 may be an application related to booking vehicles, taxi, and the like. The fifth object 515 may be an application related to vehicles. The sixth object 516 may be an application related to a camera, a photo, and the like. The seventh object 517 may be an application related to the Internet of things (IoT).

According to an embodiment of the present disclosure, when a user input of scrolling the plurality of objects 511-517 is detected in the first user interface 510, the processor 120 may move the display positions of the plurality of objects according to the scroll input, and display the objects. For example, when a user input of scrolling up is detected, the processor 120 may not display the first object 511 and may display the third object 513 to the ninth object according to the scroll input. Alternatively, the processor 120 may not display the first object 511 and the second object 512 and may display the fourth object 514 to the tenth object according to the scroll input.

A screen 520 shows an example of receiving a touch input from the user in the first user interface 510. The processor 120 may detect a touch input 521 on the third object 513 in the first user interface 510. The processor 120 may identify an application corresponding to the third object 513 of the position where the touch input 521 is detected.

A second user interface 530 indicates an execution screen of the application related to the third object 513. For example, the processor 120 may execute a contacts application related to the third object 513 and display the execution screen of the contacts application in the form of a card. That is, the processor 120 may magnify the size of the third object 513 and display the execution screen of the contacts application corresponding to the third object 513 on the full screen of the display 160. The execution screen of the contacts application may display contacts stored in the electronic device 101 and listed by the contact's name (for example, AAA1, AAA2, AAA3, and the like or phone numbers).

FIG. 5B illustrates switching between a home screen and an application execution screen according to embodiment of the present disclosure.

Referring to FIG. 5B, a first user interface 550 may be a home screen which displays a plurality of objects of a card shape in a stack structure. The processor 120 may detect a touch input 555 on a second object (for example, Maps) in the first user interface 550. The processor 120 may identify an application corresponding to the second object of the position where the touch input 555 is detected. In this case, the identified application may be a map application.

A second user interface 560 may be an execution screen of the map application corresponding to the second object. The processor 120 may process the first user interface 550 as a background and process the second user interface 560 as a foreground. While the second user interface 560 is processed as the foreground, the first user interface 550 processed as the background may not be shown. When a touch input on the execution screen of the map application is detected, the processor 120 may perform a function corresponding to the touch input (for example, magnifying or reducing a map). Alternatively, when a touch input on a back (or cancel) button 565 is detected, the processor 120 may display a home screen 570 in response to the back button 565.

That is, the home screen 570 is the same as the first user interface 550, and may be a result of processing the execution screen of the map application as the background and processing the home screen 570 as the foreground when the back button 565 is executed in the second user interface 560. While the home screen 570 is processed as the foreground, the second user interface 560 may not be shown. The processor 120 may perform a function related to the map application or return to the home screen according to the user input.

Figure 6A:
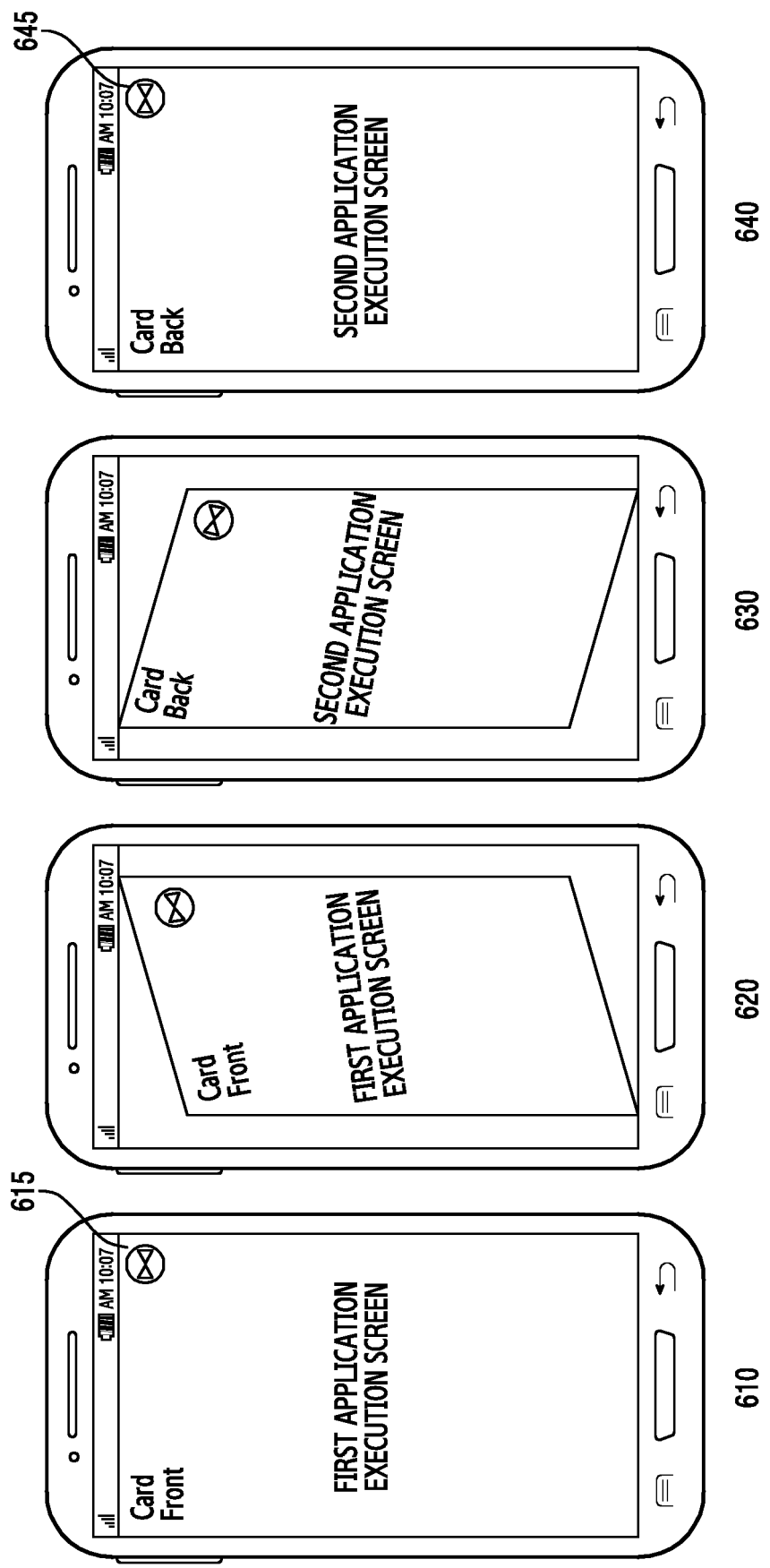
FIG. 6A illustrates screenshots of displaying two applications in a flip form according to an embodiment of the present disclosure.

FIG. 6A Illustrates screenshots of displaying two applications in a flip form according to an embodiment of the present disclosure.

Referring to FIG. 6A, the processor 120 may display an execution screen 610 of a first application. The execution screen 610 of the first application may be displayed in the form of a card, and includes a flip indicator 615. The execution screen 610 of the first application may be a screen which is displayed as a result of executing an application corresponding to a selected object when the object is selected in the first user interface 510 of FIG. 5A or the first user interface 550 of FIG. 5B. When the flip indicator 615 is selected (for example, touched), an execution screen 640 of a second application may be displayed. The execution screen 640 of the second application may be displayed in the form of a card and includes a flip indicator 645.

The flip indicator 615 and the flip indicator 645 are displayed as the same icon, and hereinafter, the flip indicator 615 will be referred to as a first flip indicator and the flip indicator 645 will be referred to as a second flip indicator in order to prevent confusion therebetween. For example, the first flip indicator 615 is for executing the second application in the first application and the second flip indicator 645 is for executing the first application in the second application. That is, the first flip indicator 615 may be displayed on the execution screen 610 of the first application and the second flip indicator 645 may be displayed on the execution screen 640 of the second application. Accordingly, when the first flip indicator 615 is selected in the execution screen 610 of the first application, the processor 120 may display the execution screen 640 of the second application. When the second flip indicator 645 is selected in the execution screen 640 of the second application, the processor 120 may display the execution screen 610 of the first application. The first flip indicator 615 and the second flip indicator 645 are for switching from one application execution screen to another application execution screen without returning to the home screen to execute different applications.

According to an embodiment of the present disclosure, when the execution screen 610 of the first application is switched to the execution screen 640 of the second application, the processor 120 may display a visual effect showing that the execution screen 610 of the first application is flipped over horizontally (or vertically) like a card. For example, when the first flip indicator 615 is selected in the execution screen 610 of the first application, the processor 120 may display a first user interface 620 and a second user interface 630 showing that a card is flipped over from the front side to the back side. The first user interface 620 shows a state in which the front side of the card is flipped horizontally by half. That is, the first user interface 620 may indicate a screen showing that the execution screen 610 of the first application skews (for example, a screen having a predetermined inclination). When the front side of the card is completely flipped over, the screen may be displayed as the second user interface 630. The second user interface 630 shows a state in which the card is flipped over to the back side by half. That is, the second user interface 630 may indicate a screen showing that the execution screen 640 of the second application skews.

Figure 6B:
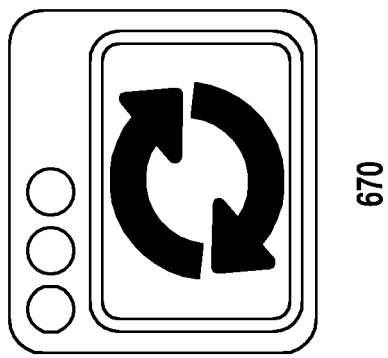
FIG. 6B illustrates a flip indicator according to an embodiment of the present disclosure.
Figure 6B:
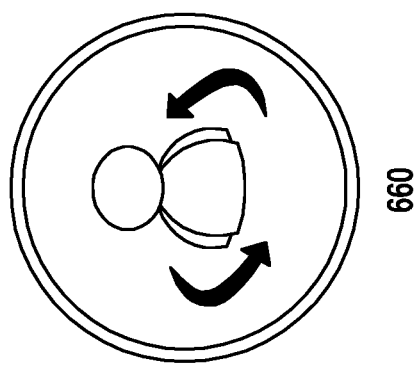
Figure 6B:
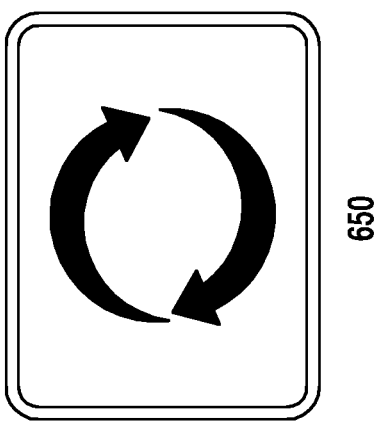

FIG. 6B illustrates a flip indicator according to an embodiment of the present disclosure.

Referring to FIG. 6B, flip indicators 650, 660, 670 may be displayed in various forms. For example, flip indicators 650, 660, 670 may include a circulation arrow to imply that two different applications are switched. The shapes shown in FIG. 6B are merely an example of the flip indicator and the flip indicator may have various shapes not shown in FIG. 6B.

Figure 7:
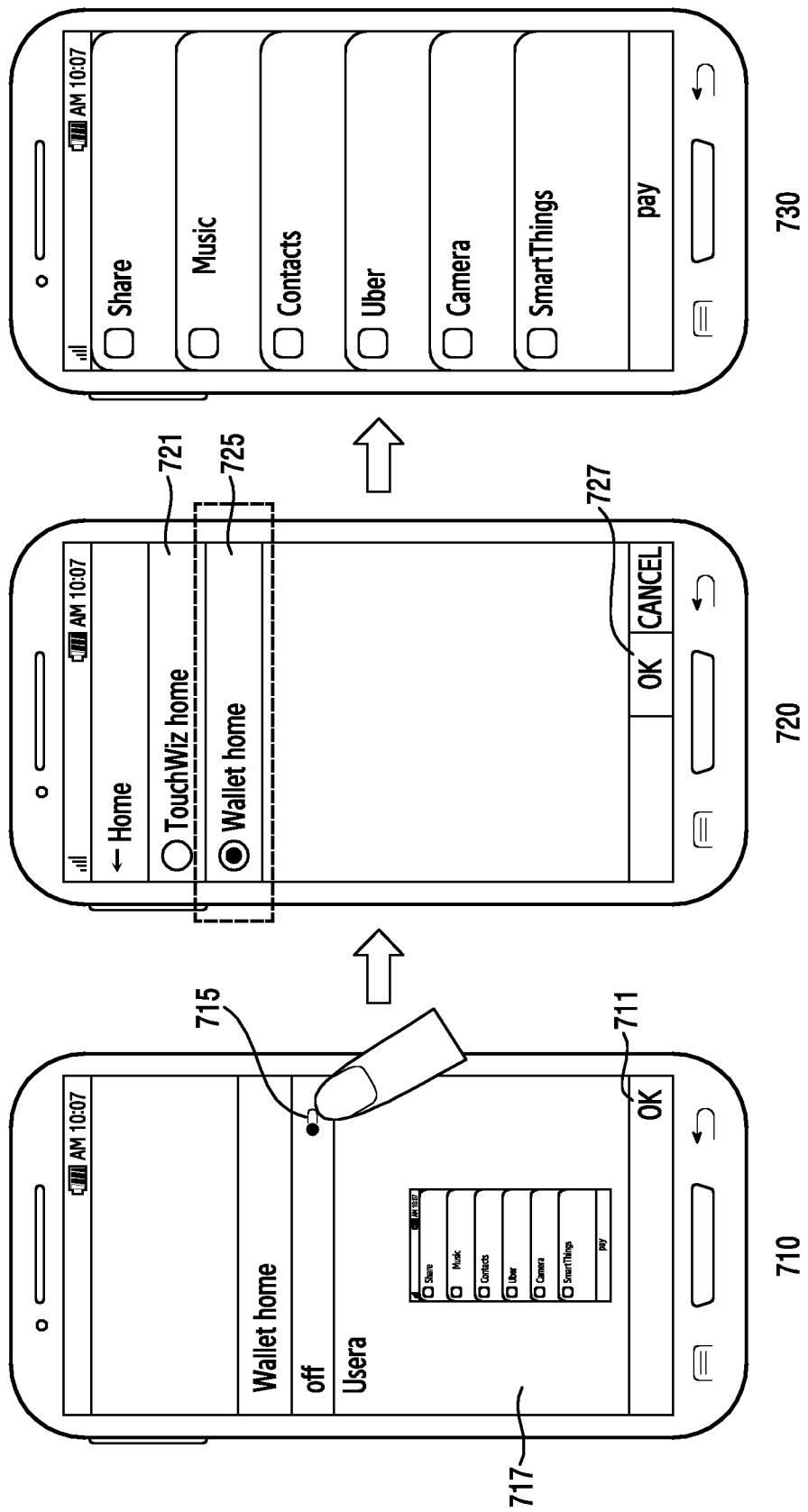
FIG. 7 illustrates screenshots of setting a home screen of a stack structure in an electronic device according to an embodiment of the present disclosure.

FIG. 7 illustrates screenshots of setting a home screen of a stack structure in an electronic device according to an embodiment of the present disclosure.

Referring to FIG. 7, the processor 120 may display a first user interface 710 or a second user interface 720 for setting a home screen. The first user interface 710 includes home screen introduction information 717 and an on/off button 715 for setting the home screen. The home screen introduction information 717 may include text for introducing the home screen and an image displaying an example of the home screen. The on/off button 715 may be a button for switching on or off according to a user's selection. For example, when the on/off button 715 is turned on and an Ok button 711 is selected, the processor 120 may set a home screen (for example, Wallet home) displaying objects of a card shape in a stack structure as the home screen of the electronic device 101.

The second user interface 720 includes a first home screen item 721 (TouchWiz home) and a second home screen item 725 (Wallet home). The first home screen item 721 may be an item for setting a home screen in which icons corresponding to applications are displayed one by one. The second home screen item 725 may be an item for setting a home screen in which objects having a card shape are displayed in a stack structure. For example, when the second home screen item 725 is selected and an Ok button 727 is selected, the processor 120 may set the home screen in which the objects of the card shape are displayed in the stack structure as the home screen of the electronic device 101.

A third user interface 730 may be displayed when the on/off button 715 is set to an on state in the first user interface 710 and the Ok button 711 is selected. Alternatively, the third user interface 730 may be displayed when the second home screen item 725 is selected in the second user interface 720 and the Ok button 727 is selected.

Figure 8:
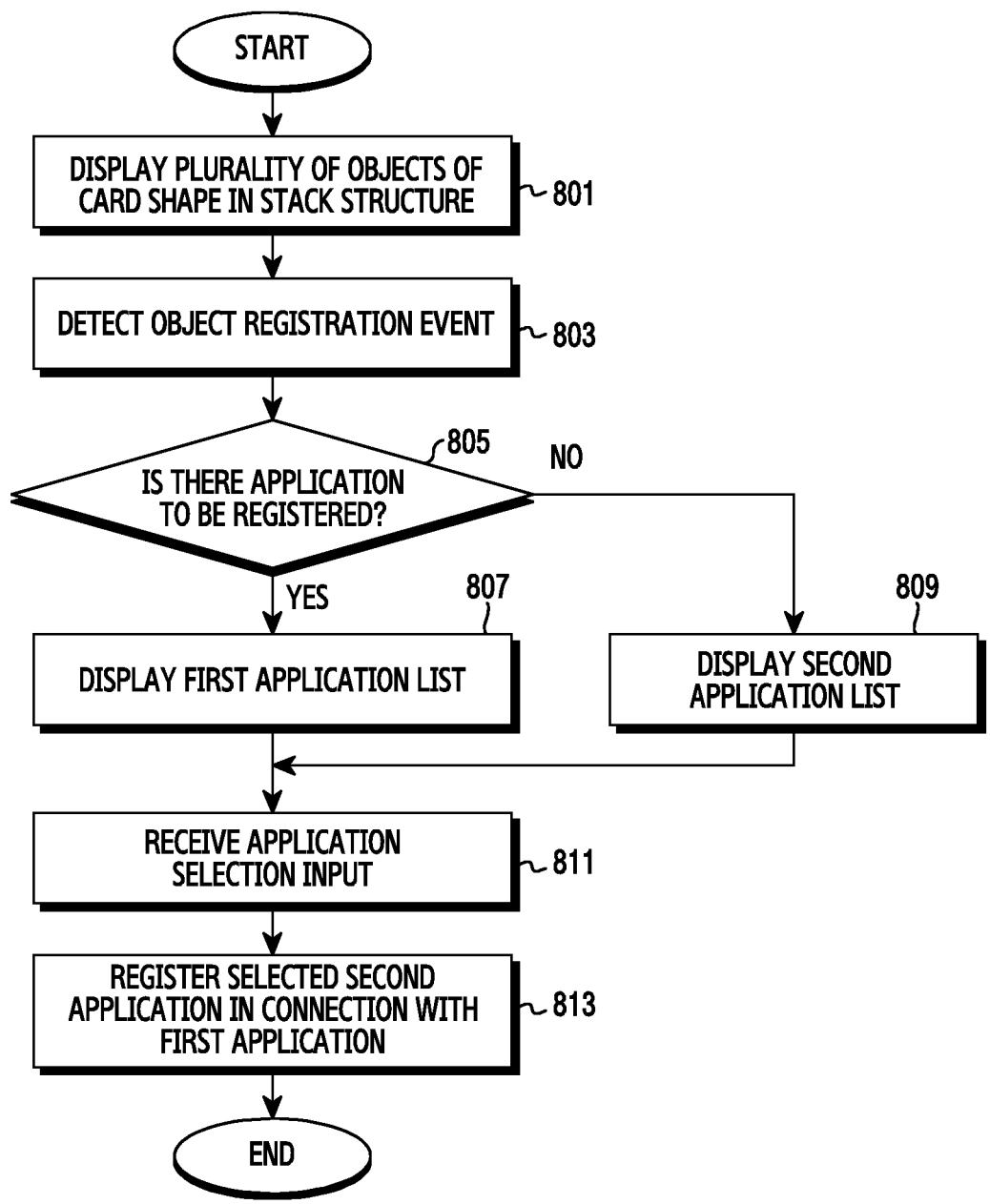
FIG. 8 is a flowchart of a method for registering an application in a home screen of a stack structure in an electronic device according to an embodiment of the present disclosure.

FIG. 8 is a flowchart of a method for registering an application in a home screen of a stack structure in an electronic device according to an embodiment of the present disclosure.

Referring to FIG. 8, in step 801, the electronic device 101 (for example, the processor 120) displays a plurality of objects of a card shape in a stack structure. Since step 801 is the same as or similar to step 401 of FIG. 4, a detailed description thereof is omitted.

In step 803, the electronic device 101 (for example, the processor 120) detects an object registration event. The object registration event may be a user input for registering an application corresponding to an object. For example, when a user's touch input of pressing and holding one object (for example, a long touch) from among the plurality of objects (for example, in the home screen) is detected, the processor 120 may determine that the object registration event is detected. For example, when an application corresponding to an object is registered, the user input corresponding to the object registration event may be different from a tap touch detected in step 403 or 409 of FIG. 4. The long touch may refer to touching for a longer time than the tap touch. For example, when one application corresponding to an object is registered (for example, the first user interface 510 of FIG. 5A) and the object is pressed and held (long touch), the long touch may be for registering another application. Although the long touch is described by way of an example for easy understanding, the user input corresponding to the object registration event may include a touch (for example, a multi touch) distinguished from the tap touch.

When an application corresponding to an object is not registered, the user input corresponding to the object registration event may be the same as or similar to the tap touch detected in step 403 or 409 of FIG. 4. When indicators (for example, buttons, icons, and the like) for registering two applications at one object are included (for example, 1110 or 1150 of FIG. 11), and an indicator indicating an application which is not registered is selected, the user input corresponding to the object registration event may be the same as or similar to the tap touch detected in step 403 or 409 of FIG. 4. An indicator indicating an application which is registered may be displayed in the form of an icon corresponding to the application, and an indicator indicating an application which is not registered may be displayed in the form of an empty image or a register (or add) button.

In step 805, the electronic device 101 (for example, the processor 120) determines whether there is an application to be registered. For example, when one application is already registered with one object, the processor 120 may search an application to be registered in connection with the already registered application. The processor 120 may perform step 807 when there is an application to be registered, and may perform step 809 when there is not an application to be registered.

When there is an application to be registered (for example, Yes in step 805), the electronic device 101 (for example, the processor 120) displays a first application list in step 807. The first application list may be provided through a user interface in which a plurality of objects of a card shape are displayed in a stack structure. Alternatively, the first application list may be provided in other forms. For example, the first application list may include a second application related to the application already registered with the object (for example, a first application) from among the applications installed in the electronic device 101. The second application may be an application which provides a function similar to, continuous to, or related to the attribute of the first application, or an additional function. The processor 120 may identify the second application and generate the first application list including the identified second application.

Table 1 shows examples of the first application and the second application:

TABLE 1

| First Application | Second Application (or page) |
|---|---|
| First map | Second map, route guidance, public transportation<br>Back, Next, Setting, or Add function on the first map |
| First Internet | Second Internet, search, integration<br>Back, Next, Setting, or Add function of the first Internet |
| First message | Second message, messenger, camera<br>Back, Next, Setting, or Add function of the first message |

TABLE 1-continued

| First Application | Second Application (or page) |
|---|---|
| Application store | Other application stores<br>Back, Next, Setting, or Add function of the application store |
| Telephone | Contacts, message, email, messenger<br>Back, Next, Setting, or Add function of the telephone |
| First music | Second music, video, or music or video editing<br>Back, Next, Setting, or Add function of the first music |
| First camera | Second camera, gallery, photo editing<br>Back, Next, Setting, or Add function of the first camera |
| Scrap book | Note<br>Back, Next, Setting, or Add function of the scrap book |
| First messenger | Second messenger, third messenger, another application provided by the second messenger<br>Back, Next, Setting, or Add function of the first messenger |
| First credit card | Second credit card, check card, cash card, point card<br>Back, Next, Setting, or Add function of the first credit card |

Referring to Table 1, when the first application is a "first map application," the first application list may include at least one of a second map application (for example, a map application different from the first map application), a route guidance (or route finding) application, or a public transportation (for example, a bus, a subway) application. Alternatively, when the first application is a first Internet application, the first application list may include at least one of a second Internet application (for example, an Internet application different from the first Internet application), a search application, or an integration application. Alternatively, when the first application is a first message application, the first application list may include at least one of a second message application (for example, a message application different from the first message application), a messenger application, or a camera application. The processor 120 may provide the first application list including the second application searched based on the attribute of the first application as shown in Table 1.

According to an embodiment of the present disclosure, when the first application is a "first map application," a page related to the first application may be a previous page, a next page, a setting page, or an additional function page of the first map application. Alternatively, when the first application is a first Internet application, the page related to the first application may be a previous page, a next page, a setting page, or an additional function page of the first Internet application.

When there is not an application to be registered (No in step 805), the electronic device 101 (for example, the processor 120) displays a second application list in step 809. The second application list may be provided through a user interface in which a plurality of objects of a card shape are displayed in a stack structure. Alternatively, the second application list may be provided in other forms. For example, when the second application related to the first application is not searched, the processor 120 may provide the second application list based on a user's use history. The use history may be one of the number of times of using an application, a time of use, and a period of use. For example, the processor 120 may identify applications which are used by the user while the first application is being executed, and may generate the second application list by listing the identified applications in an ascending order (for example, in order of a high use history) according to the number of times of using the identified applications, the time of use, and the period of use.

Accordingly, the second application list may be the same as or different from the first application list. For example, the second application list may include a third application which is not related to the first application based on the use history from among applications installed (or installable) in the electronic device 101. For example, the second application list may include at least one of the second application or the third application.

In step 811, the electronic device 101 (for example, the processor 120) receives an application selection input. For example, the processor 120 may receive a user input of selecting an object corresponding to one application in the first application list or the second application list. Since the first application list or the second application list displays the plurality of objects of the card shape in the stack structure, the user input of selecting one object from among the plurality of objects may be the application selection input.

In step 813, the electronic device 101 (for example, the processor 120) registers the selected second application (or the third application) by relating the second application to the first application. For example, the processor 120 may register an application (for example, the second application) selected from the first application list by relating the application to the first application. Alternatively, the processor 120 may register an application (for example, the third application) selected from the second application list by relating the application to the first application. When the second application (or the third application) is registered in connection with the first application, and a flip indicator on the execution screen of the first application is selected, the second application (or the third application) may be executed.

Figure 9A:
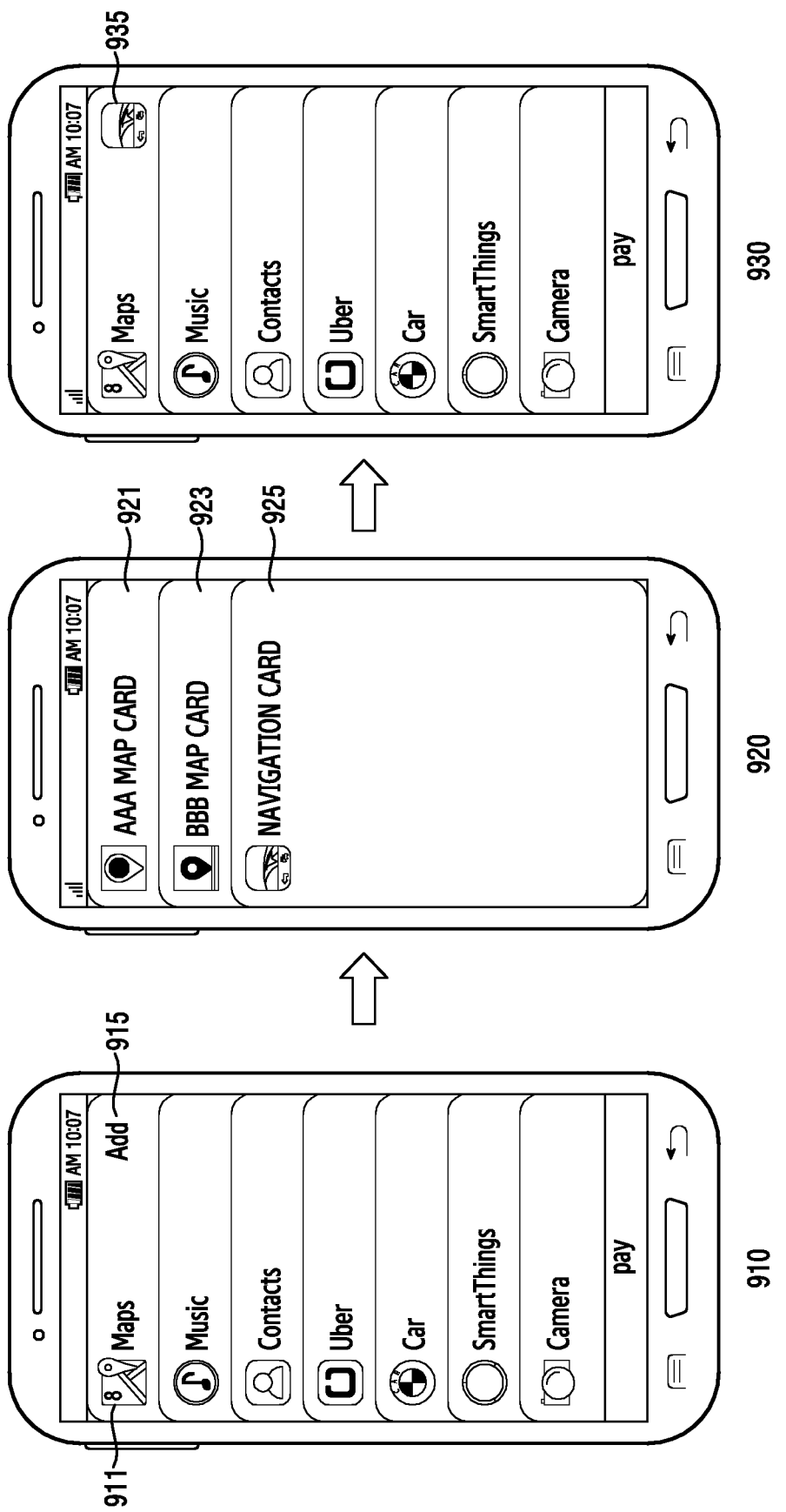
FIG. 9A illustrates screenshots of registering a second application in connection with a first application according to an embodiment of the present disclosure.

FIG. 9A illustrates a screenshot of registering a second application in connection with a first application according to an embodiment of the present disclosure.

Referring to FIG. 9A, the processor 120 may provide a first user interface 910 displaying a plurality of objects of a card shape in a stack structure. The first user interface 910 may have one application corresponding to one object. For example, the first user interface 910 may have a map application (for example, Maps) registered in response to a first object 911. Each object may include information on an application. For example, the information on the application (for example, function information on the application) may include a text or an image. The text may indicate the name (or identifier) of the application. The image may indicate an icon (or indicator) indicating the application. The processor 120 may detect an object registration (addition) event 915 for registering another application in response to the first object 911. The object registration event 915 may be an input for registering another application except for the map application in response to the first object 911. For example, the object registration event 915 may be a user input of selecting an "Add" item on the first object 911.

When the object registration event is detected, the processor 120 may provide a second user interface 920 based on the application registered with the object where the object registration event is detected. The second user interface 920 may display a plurality of objects of a card shape in a stack structure. For example, the second user interface 920 may include a second application related to the map application registered with the first object 911. For example, the second application may include an AAA map application 921, a BBB map application 923, and a navigation application 925. The AAA map application 921 or the BBB map application 923 may be an application different from the map application registered with the first object 911. The AAA map application 921 may be different from the BBB map application 923.

According to an embodiment of the present disclosure, the processor 120 may provide a first application list based on the attribute of the application as the second user interface 920. For example, the first application list may include the second application related to the map application (for example, having a similar attribute) registered with the first object 911. Alternatively, the processor 120 may provide a second application list based on a use history as the second user interface 920. For example, the second application list may include the second application or a third application which is not related to the map application registered with the first object 911 (for example, having no similar attribute). The processor 120 may detect a user input of selecting one application in the second user interface 920.

When a user input of selecting an application is detected, the processor 120 may register the selected application at the first object 911 by relating the application to the map application. The processor 120 may provide a third user interface 930 having the selected application registered with the first object 911. The third user interface 930 may have a navigation application 935 registered with the first object 911 with the map application. That is, the processor 120 may register (or store) two applications (for example, the map application 911 and the navigation application 935) in response to the first object 911.

Figure 9B:
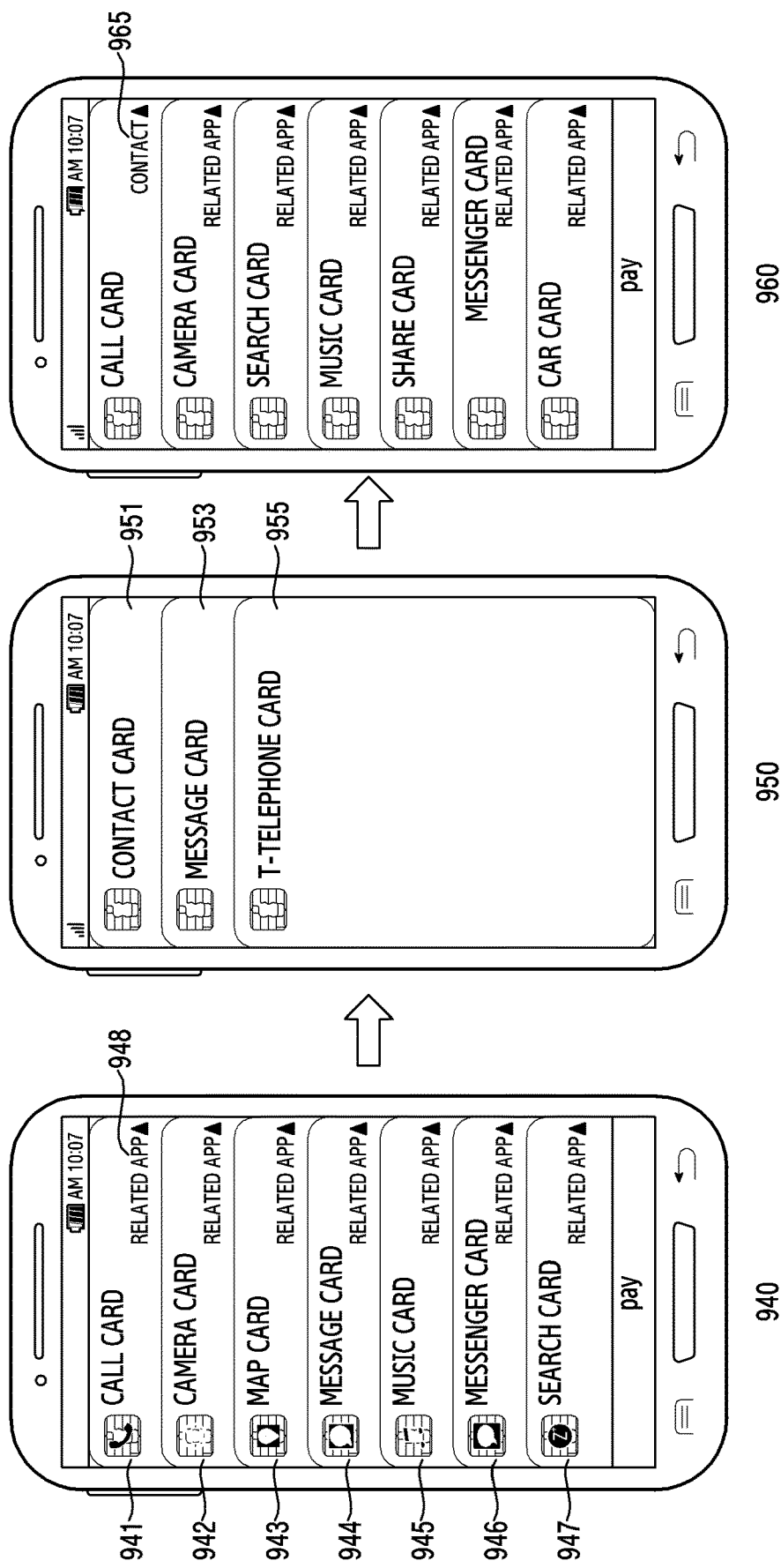
FIG. 9B illustrates screenshots of registering a second application in connection with a first application according to another embodiment of the present disclosure.

FIG. 9B illustrates screenshots of registering a second application in connection with a first application according to an embodiment of the present disclosure.

Referring to FIG. 9B, the processor 120 may provide a first user interface 940 displaying a plurality of objects of a card shape in a stack structure. The first user interface 940 includes a first object 941 (Call), a second object 942 (Camera), a third object 943 (Map), a fourth object 944 (Message), a fifth object 945 (Music), a sixth object 946 (Messenger), and a seventh object 947 (Search). The first user interface 940 may show that two or more applications may be registered with each object. For example, the first user interface 940 may include information on an application registered with an object (for example, a text (for example, CALL CARD, CAMERA CARD), an image (for example, a telephone image on a card chip)), and an indicator 948 (RELATED APP) indicating that another application may be registered.

When an input of the user selecting the indicator 948 is detected, the processor 120 may provide a second user interface 950 based on the application registered with the first object 941. For example, the second user interface 950 may be an application list including a contacts application 951, a message application 953, or a T-telephone application 955 based on the telephone application (for example, CALL CARD) registered with the first object 941. According to an embodiment of the present disclosure, the processor 120 may generate an application list based on the attribute of the telephone application registered with the first object 941 or a user history, and provide the second user interface 950 including the generated application list.

When a user input of selecting an application in the second user interface 950 is detected, the processor 120 may register the selected application at the first object 941 by relating the application to the telephone application. The processor 120 may provide a third user interface 960 in which the selected contacts application 965 (CONTACT) is registered with the first object 941 with the telephone application (CALL CARD).

Figure 9C:
FIG. 9C illustrates displaying information related to an application in an object of a card shape according to an embodiment of the present disclosure.
Figure 9C:
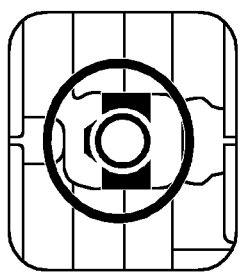
Figure 9C:
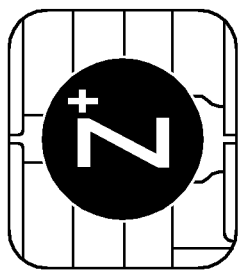
Figure 9C:
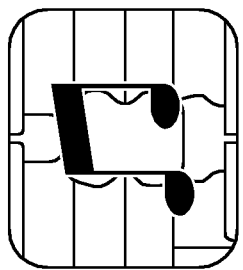
Figure 9C:
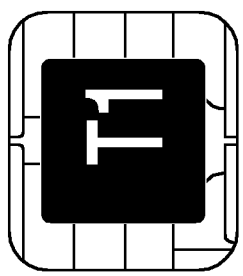
Figure 9C:
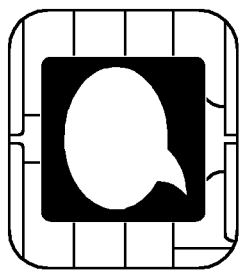

FIG. 9C illustrates displaying information related to an application in an object of a card shape according to an embodiment of the present disclosure.

Referring to 9C, the processor 120 may display information on an application registered with each object on a card chip (integrated circuit) shape. For example, the processor 120 may include an image (or an icon) indicating an application on a card chip shape. For example, the processor 120 may include a telephone image (for example, a telephone) in a card chip shape 971 related to the telephone application. The processor 120 may include a camera image on a card chip shape 972 related to the camera application. The processor 120 may include an image related to a search on a card chip shape 973 related to the search application. The processor 120 may include an image (for example, a note) related to music on a card chip shape 974 related to the music application. The processor 120 may include an image related to a messenger on a card chip shape 975 related to the messenger application. The processor 120 may include an image related to a message on a card chip shape 976 related to the message application.

Figure 10A:
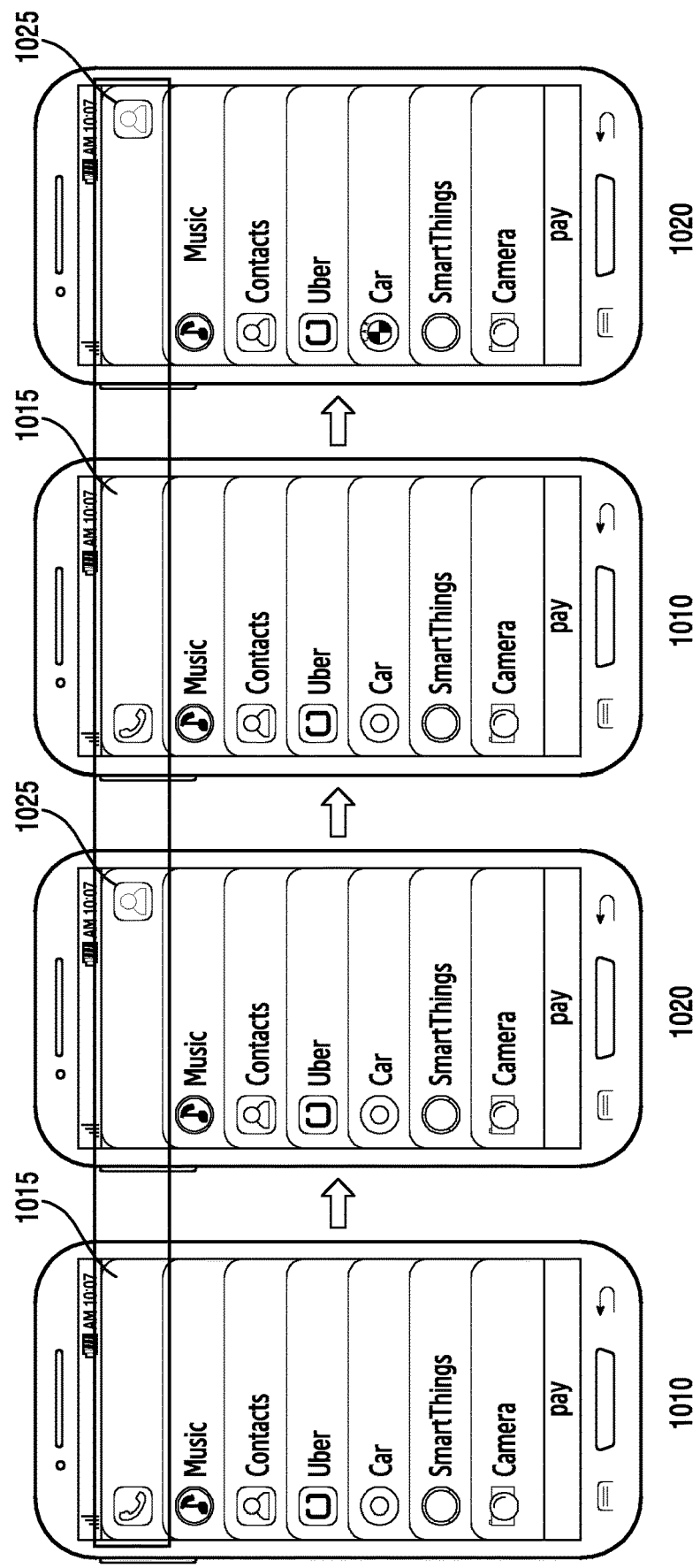
FIG. 10A illustrates registering (or adding) an application with an object according to an embodiment of the present disclosure.
Figure 10B:
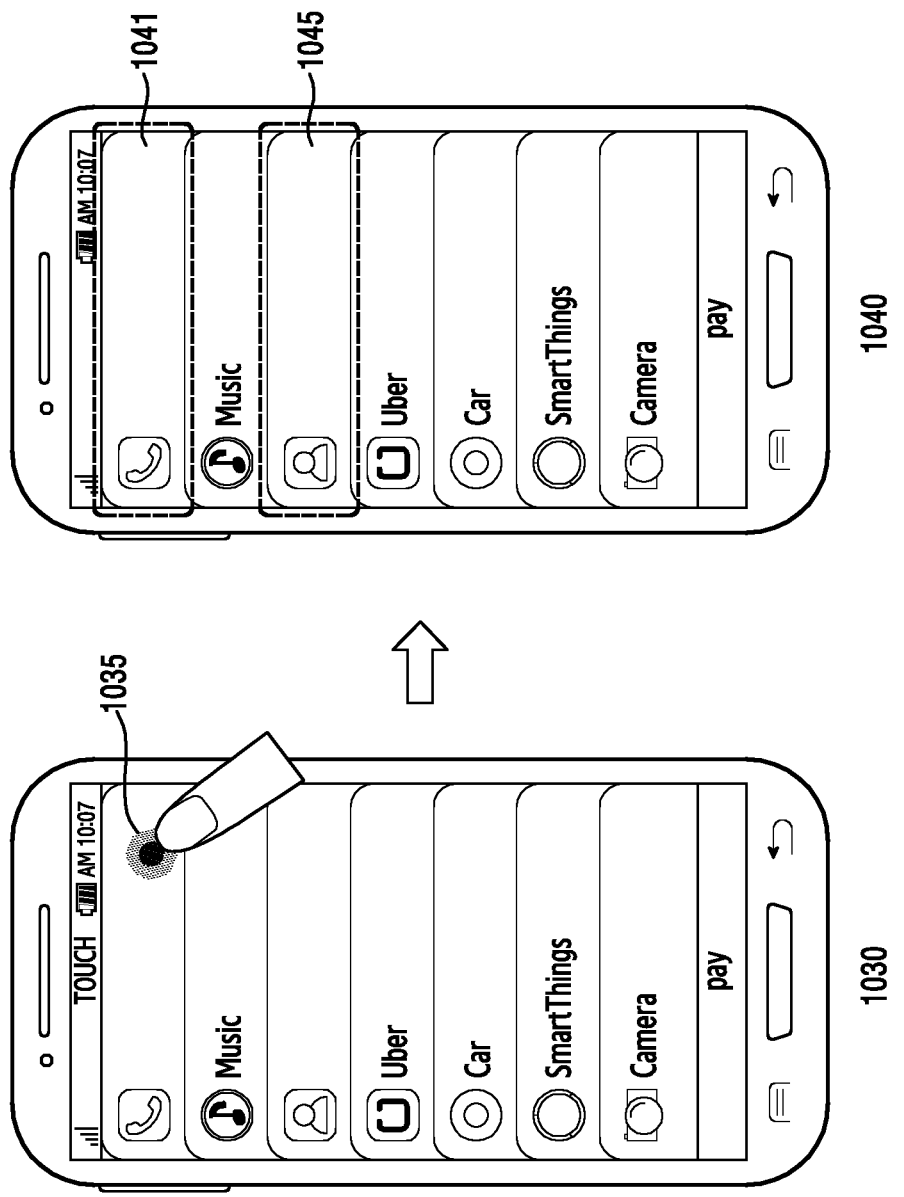
FIG. 10B illustrates registering (or adding) an application with an object according to another embodiment of the present disclosure.

FIGS. 10A and 10B illustrate screenshots of registering an application in an electronic device according to an embodiment of the present disclosure.

FIG. 10A illustrates registering (or adding) an application with an object according to an embodiment of the present disclosure.

Referring to FIG. 10A, when an object addition (or registration) event is detected in an object in which a phone application is registered, the processor 120 may provide a first user interface 1010 and a second user interface 1020 alternately. For example, the processor 120 may detect the object addition event in the first user interface 1010 in which the telephone application 1015 is registered. When the object addition (or registration) event is detected and a predetermined time (for example, 1 second) elapses, the processor 120 may display the second user interface 1020. The second user interface 1020 includes a contacts application 1025.

The processor 120 may recommend the contacts application 1025 based on the attribute of the telephone application 1015 or a use history. When a predetermined time (for example, 1 second) elapses after the second user interface 1020 has been displayed, the processor 120 may display the first user interface 1010 again. That is, the processor 120 may alternately display the first user interface 1010 and the second user interface 1020 according to a predetermined time. When an Ok button is selected in the first user interface 1010 or the second user interface 1020 or a predetermined time elapses, the processor 120 may register the contacts application 1025 with the first object in connection with the telephone application 1015.

FIG. 10B illustrates registering (or adding) an application with an object according to another embodiment of the present disclosure.

Referring to FIG. 10B, the processor 120 may provide a first user interface 1030 displaying a plurality of objects of a card shape in a stack structure. The processor 120 may detect an object registration (or addition) event 1035 on a position of an object in which a telephone application is registered in the first user interface 1030. The processor 120 may recommend a contacts application 1045 based on the attribute of the telephone application registered at the position where the object registration event 1035 is detected, or a use history. The processor 120 may provide a second user interface 1040 which displays the telephone application 1041 or the contacts application 1045 to be distinguished from the other applications. For example, the second user interface 1040 may highlight (for example, underline) the telephone application 1041 or the contacts application 1045, or may display the telephone application 1041 or the contacts application 1045 to flicker, and may shade the other applications (for example, Uber, Car, SmartThings, Camera).

Figure 11:
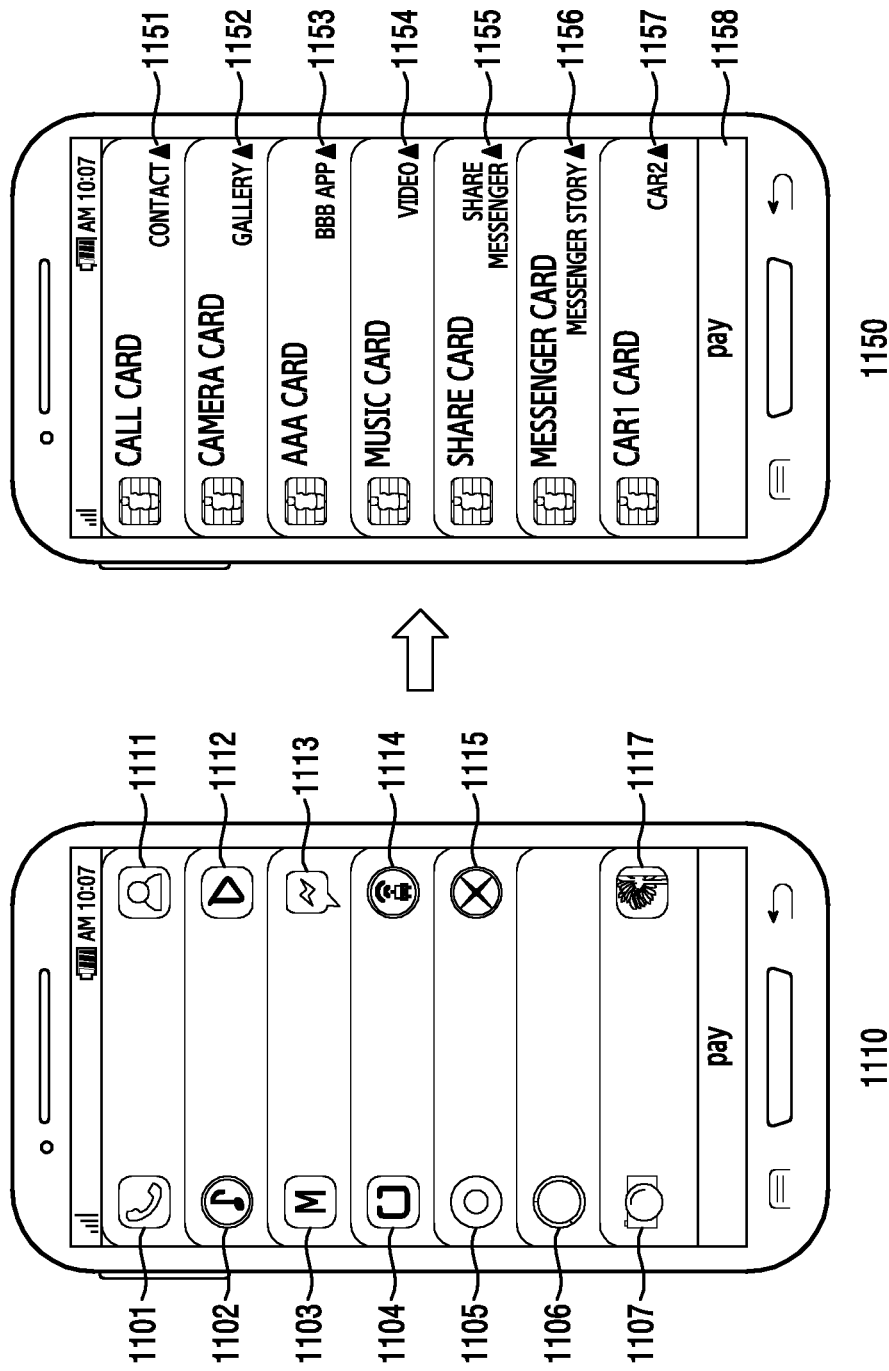
FIG. 11 illustrates screenshots of displaying related applications on a home screen of a stack structure in an electronic device according to an embodiment of the present disclosure.

FIG. 11 illustrates screenshots displaying related applications on a home screen of a stack structure in an electronic device according to an embodiment of the present disclosure.

Referring to FIG. 11, the processor 120 may provide a first user interface 1110 displaying a plurality of objects of a card shape in a stack structure. The first user interface 1110 may have two applications registered with one object. For example, the first user interface 1110 may include a first object 1101 to a seventh object 1107, and may include images (or icons) on two applications registered with each object. In FIG. 11, images of two applications registered with an object are displayed at opposite sides of the object. However, an object may be divided into a first area (for example, a left area) and a second area (for example, a right area), and images on two applications registered with the object may be displayed on the center of each area.

The first object may have a telephone application 1101 and a contacts application 1111 registered. The second object may have a music application 1102 and a video application 1112 registered. The third object may have a first message application 1103 and a second message application 1113 registered. The fourth object may have a vehicle booking application 1104 and a taxi booking application 1114 registered. The fifth object may have a route guidance application 1105 and a public transportation application 1115 registered. The sixth object may have an application store application 1106 registered. The seventh object may have a camera application 1107 and a gallery application 1117 registered.

According to an embodiment of the present disclosure, when an image (or an icon) on an application registered with each object is selected (for example, a tap touch), the processor 120 may execute the application corresponding to the selected image. When one object is divided into a first area and a second area with reference to the center, and a touch input is detected in the first area, the processor 120 may execute a first application corresponding to the first area, and, when a touch input is detected in the second area, the processor 120 may execute a second application corresponding to the second area. For example, when a touch input is detected in the first area (for example, the left area of the object), the processor 120 may execute the first application (for example, the telephone application 1101, the music application 1102, the first message application 1103, and the like). Alternatively, when a touch input is detected in the second area (for example, the right area of the object), the processor 120 may execute the second application (for example, the contacts application 1111, the video application 1112, the second message application 1113).

According to an embodiment of the present disclosure, when an image (or an icon) on an application registered with each object is selected (for example, a long touch), the processor 120 may edit the application corresponding to the selected image. Editing the application may be changing information on the application (for example, a name, an image) or changing the registered application to another application. Alternatively, when an object is selected (for example, a long touch), the processor 120 may edit the selected object. Editing the object may be changing color, size, or brightness of the object or deleting the object. For example, when a long touch is performed on an object that the user wishes to delete and then an input of moving the touch to the outside of the display 160 (for example, flicking) is detected, the processor 120 may delete the object on which the touch is detected.

The processor 120 may provide a second user interface 1150 displaying a plurality of objects of a card shape in a stack structure. The second user interface 1150 may have two applications registered with one object. For example, the second user interface 1150 may include a first object 1151 to a seventh object 1158, and may include information (for example, a text or an image) on applications registered with each object. The first object 1151 may have a telephone application and a contacts application registered. The processor 120 may display an image (card chip) and a text (CALL CARD) related to the telephone application and display a text (CONTACT) related to the contacts application on the first object 1151. The second object 1152 may have a camera application and a gallery application registered. The processor 120 may display an image (card chip) and a text (CAMERA CARD) related to the camera application and display a text (GALLERY) related to the gallery application on the second object 1152.

The third object 1153 may have an AAA map application and a BBB map application registered. The processor 120 may display an image (card chip) and a text (AAA Map) related to the AAA map application and display a text (BBB Map) related to the BBB map application on the third object 1153. The fourth object 1154 may have a music application and a video application registered. The processor 120 may display an image (card chip) and a text (MUSIC CARD) related to the music application and display a text (VIDEO) related to the video application on the fourth object 1154. The fifth object 1155 may have a share application and a share messenger application registered. The processor 120 may display an image (card chip) and a text (Share) related to the share application and display a text (SHARE MESSENGER) related to the share messenger application on the fifth object 1155.

The sixth object 1156 may have a messenger application and a messenger story application registered. The processor 120 may display an image (card chip) and a text (MESSENGER CARD) related to the messenger application and display a text (MESSENGER STORY) related to the messenger story application on the sixth object 1156. The seventh object 1157 may have a car 1 application and a car 2 application registered. The processor 120 may display an image (card chip) and a text (CAR1 CARD) related to the car 1 application and display a text (CAR2) related to the car 2 application on the seventh object 1157.

The second user interface 1150 may further include an eighth object 1158 and may have a payment application registered with the eighth object 1158.

Figure 12:
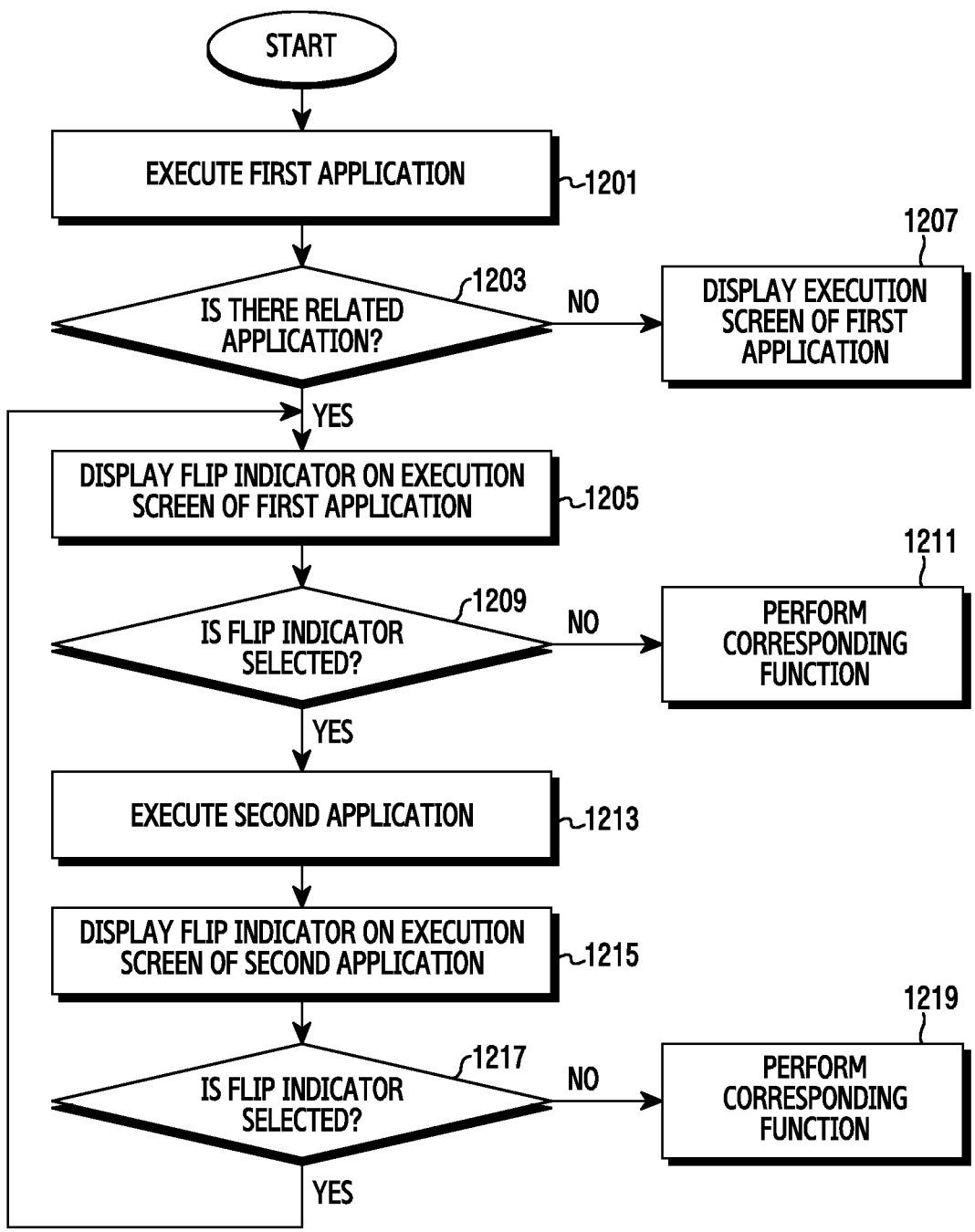
FIG. 12 is a flowchart of a method for executing related applications in an electronic device according to an embodiment of the present disclosure.

FIG. 12 is a flowchart of a method for executing related applications in an electronic device according to an embodiment of the present disclosure.

Referring to FIG. 12, in step 1201, the electronic device 101 (for example, the processor 120) executes a first application. For example, when the first application is executed, the processor 120 may display an execution screen of the first application on the display 160.

In step 1203, the electronic device 101 (for example, the processor 120) determines whether there is an application related to the first application. The application related to the first application may be another application registered with an object to which the first application is registered. Alternatively, the application related to the first application may be an application which is provided based on the attribute of the first application or a user's use history. When there is a related application, the processor 120 performs step 1205, and, when there is not a related application, the processor 120 performs step 1207.

When there is a related application (Yes in step 1203), the electronic device 101 (for example, the processor 120) displays a flip indicator on the execution screen of the first application in step 1205. The flip indicator may be for executing another application related to the first application. The execution screen of the first application may be displayed in the form of a card. The processor 120 may display the flip indicator on a part of the execution screen of the first application.

When there is not a related application (No in step 1203), the electronic device 101 (for example, the processor 120) displays the execution screen of the first application in step 1207. That is, when there is not an application related to the first application, the processor 120 does not display the flip indicator on the execution screen of the first application. The execution screen of the first application may be displayed in the form of a card.

In step 1209, the electronic device 101 (for example, the processor 120) detects whether the flip indicator is selected or not. For example, the processor 120 may determine whether a touch input on the flip indicator is detected or not. When the flip indicator is not selected, the processor 120 performs step 1211, and, when the flip indicator is selected, the processor 120 performs step 1213.

When the flip indicator is selected (Yes in step 1209), the electronic device 101 (for example, the processor 120) executes a second application in step 1213. The second application may be another application which is registered with the object to which the first application is registered. Alternatively, the second application may be an application which is provided by the processor 120 based on the attribute of the first application or a user's use history.

When the flip indicator is not selected (No in step 1209), the electronic device 101 (for example, the processor 120) performs a corresponding function in step 1211. The corresponding function may be a function which is performed according to a user's input. For example, when a touch input on the first application is received from the user, the processor 120 may perform a function regarding the first application according to the received touch input.

In step 1215, the electronic device 101 (for example, the processor 120) displays a flip indicator on the execution screen of the second application. The flip indicator may be the same as or different from the flip indicator displayed on the execution screen of the first application. For example, the flip indicator displayed on the execution screen of the first application may be referred to as a first flip indicator, and the flip indicator displayed on the execution screen of the second application may be referred to as a second flip indicator. The first flip indicator and the second flip indicator may have the same shape (or image). Alternatively, the first flip indicator may be an image related to the second application and the second flip indicator may be an image related to the first application. In this case, the user may identify what the currently displayed application is and what another application is based on the flip indicator.

In step 1217, the electronic device 101 (for example, the processor 120) detects whether the flip indicator (for example, the second flip indicator) is selected or not. For example, the processor 120 may determine whether a touch input on the flip indicator is detected or not. When the flip indicator is not selected, the processor 120 performs step 1219, and, when the flip indicator is selected, the processor 120 returns to step 1205.

When the flip indicator is not selected (No in step 1217), the electronic device 101 (for example, the processor 120) performs a corresponding function in step 1219. For example, when a touch input on the second application is received from the user, the processor 120 may perform a function regarding the second application according to the received touch input. Since step 1219 is the same as or similar to step 1211, a detailed description thereof is omitted.

When the processor 120 returns to step 1205, the processor 120 may directly flip from the execution screen of the second application to the execution screen of the first application. That is, the user may switch from the second application to the first application or switch from the first application to the second application using the flip indicator. In the present disclosure, in order to execute the second application while the first application is being executed, the user may execute the second application simply by selecting (touching) only the flip indicator. In this case, the second application may be an application which is pre-set by the user or may be an application which is frequently used based on the attribute of the first application or a user's use history. That is, the second application may be an application that the user intends to (desires to) execute.

According to an embodiment of the present disclosure, the processor 120 may switch between the first application and the second application by performing steps 1205 to 1219 according to user's selection, and may perform a function corresponding to each application.

Figure 13A:
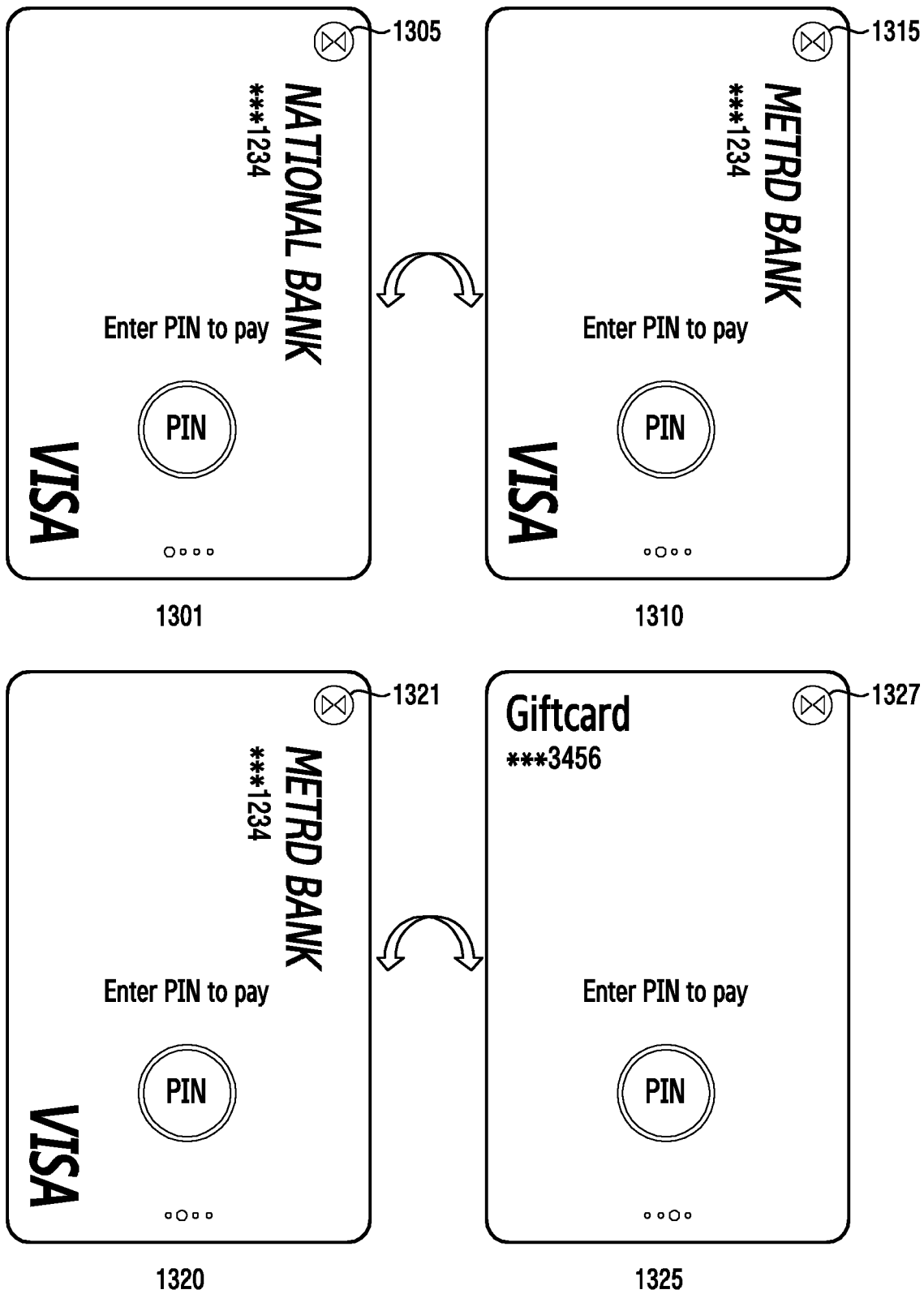
FIG. 13A illustrates a screenshot of executing a first card and a second card according to an embodiment of the present disclosure.

FIG. 13A illustrates a screenshot of executing a first card and a second card according to an embodiment of the present disclosure.

Referring to FIG. 13A, when a user input of selecting an object registered to payment application is detected, the processor 120 may provide a user interface 1301 regarding a first card. For example, the payment application may be an application which is registered with the eighth object 1158 of FIG. 11. The user interface 1301 regarding the first card may include information on the first card (for example, a card name, a card number, a card image, and the like), and a flip indicator 1305 for executing a second card. When the flip indicator 1305 is selected, the processor 120 may provide a user interface 1310 regarding the second card. The user interface 1310 regarding the second card may include information on the second card (for example, a card name, a card number, a card image, and the like) and a flip indicator 1315 for executing the first card. The first card and the second card may be credit cards, check cards, pre-paid cards, or gift cards for paying money. When the flip indicator 1305 is selected, the processor 120 may display the user interface 1310 regarding the second card, and, when the flip indicator 1315 is selected, the processor 120 may display the user interface 1301 regarding the first card. When making payments, the user may select the desired one of two cards using the flip indicators (for example, 1305, 1315).

According to an embodiment of the present disclosure, when a user input of selecting the object registered to the payment application is detected, the processor 120 may provide a user interface 1320 regarding the first card. The user interface 1320 regarding the first card may include information on the first card (for example, a card name, a card number, a card image, and the like) and a flip indicator 1321 for executing a third card. When the flip indicator 1321 is selected, the processor 120 may provide a user interface 1325 regarding the third card. The user interface 1325 regarding the third card may include information on the third card (for example, a card name, a card number, a card image, and the like) and a flip indicator 1327 for executing the first card. Herein, the first card may be a credit card, a check card, a pre-paid card, or a gift card for making payments. The third card may be a point card for saving points corresponding to all or a part of payments made, or discounting all or a part of payments made.

When the flip indicator 1321 is selected, the processor 120 may display the user interface 1325 regarding the third card, and, when the flip indicator 1327 is selected, the processor 120 may display the user interface 1320 regarding the first card. When making payments, the user may save points corresponding to all or a part of the payments made, or discount all or a part of the payments made by using the third card, and may make payments using the first card. According to an embodiment of the present disclosure, an application related to a point card for saving points or discounting (for example, the user interface 1325 regarding the third card) may be directly executed by selecting only a flip indicator in an application related to a payment card (for example, the user interface 1320 regarding the first card), so that user convenience may be enhanced.

Figure 13B:
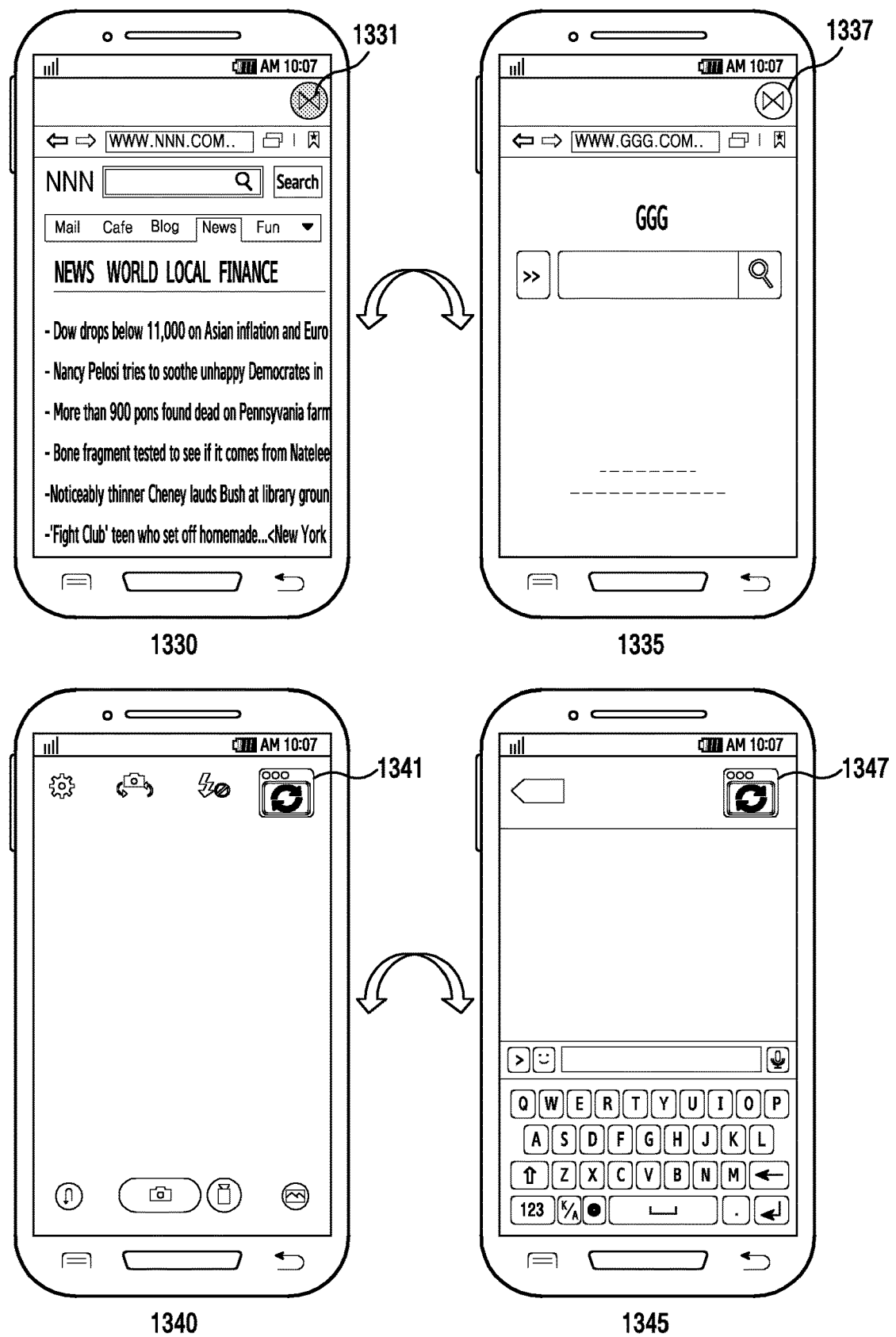
FIG. 13B illustrates a screenshot of executing an application using a flip indicator according to an embodiment of the present disclosure.

FIG. 13B illustrates screenshots of executing an application using a flip indicator according to an embodiment of the present disclosure.

Referring to FIG. 13B, when a user input of selecting an object registered to a search application is detected, the processor 120 may provide a first user interface 1330 related to a search. The first user interface 1330 includes an execution screen of a first search application and a flip indicator 1331 for executing a second search application. When the flip indicator 1331 is selected, the processor 120 may provide a second user interface 1335 related to a search. The second user interface 1335 includes an execution screen of the second search application and a flip indicator 1337 for executing the first search application. The first search application may be an application different from the second search application. When the flip indicator 1331 is selected, the processor 120 may display the second user interface 1335, and when the flip indicator 1337 is selected, the processor 120 may display the first user interface 1330. When searching, the user may execute desired one of the two applications using the flip indicator (for example, 1331, 1337).

According to an embodiment of the present disclosure, when the user input of selecting the object registered to the search application is detected, the processor 120 may provide the first user interface 1330 related to the search. The first user interface 1330 includes a first execution screen (for example, a current page) of the search application and the flip indicator 1331 for switching to a second execution screen (for example, a next page) of the search application. When the flip indicator 1331 is selected, the processor 120 may provide the second user interface 1335 related to the search. The second user interface 1335 includes the second execution screen of the search application and the flip indicator 1337 for switching to the first execution screen. For example, the first execution screen and the second execution screen may be related to the same application. However, the second execution screen may be a previous page (for example, a previous execution screen) of the first execution screen. Alternatively, the second execution screen may be a next page (for example, a next execution screen) of the first execution screen.

When there is not a previous page of the first execution screen, the processor 120 may display the next page as the second execution screen. Alternatively, when there is a previous page of the first execution screen, the processor 120 may display the previous page as the second execution screen. That is, the processor 120 may switch between different pages using the flip indicator within the same application.

When a user input of selecting an object registered to a camera is detected, the processor 120 may provide a user interface 1340 related to a camera. The user interface 1340 related to the camera includes an execution screen of the camera application and a flip indicator 1341 for executing a message application. When the flip indicator 1341 is selected, the processor 120 may provide a user interface 1345 related to a message. The user interface 1345 related to the message includes an execution screen of the message application and a flip indicator 1347 for executing the camera application. When the flip indicator 1347 is selected, the processor 120 may display the user interface 1340 related to the camera, and, when the flip indicator 1341 is selected, the processor 120 may display the user interface 1345 related to the message. The user may photograph using the camera application, and, when the flip indicator 1341 is selected, the processor 120 may transmit the photograph using the message application. Alternatively, the user may photograph by selecting the flip indicator 1347 while writing a message using the message application, and, by selecting the flip indicator 1341 after photographing, may transmit the photograph to another person using the message application.

Figure 13C:
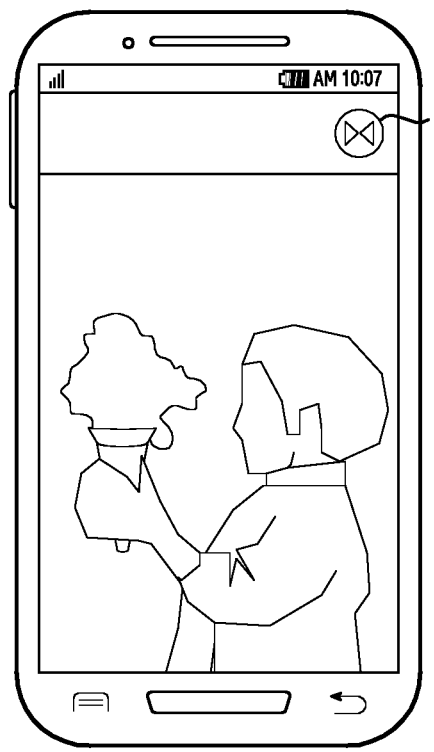
FIG. 13C illustrates a screenshot of executing an application using a flip indicator according to an embodiment of the present disclosure.
Figure 13C:
Figure 13C:
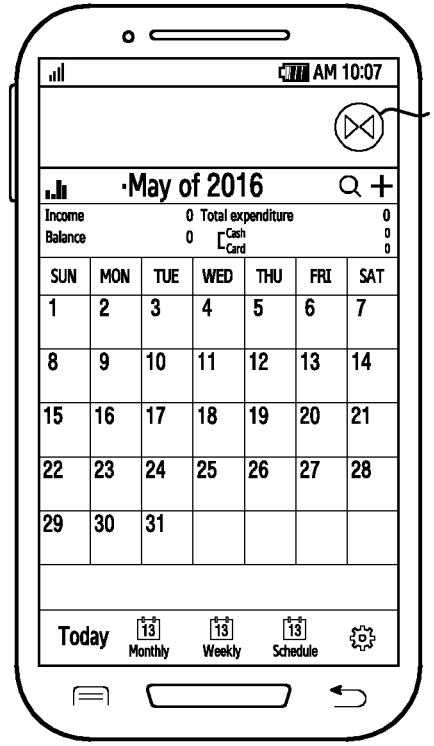
Figure 13C:
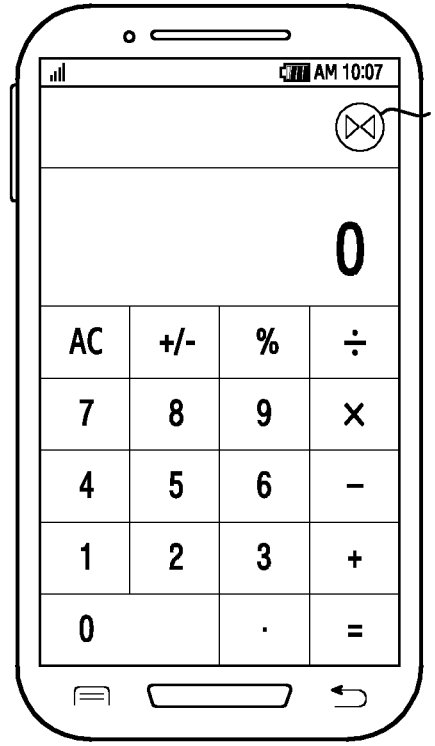

FIG. 13C is a screenshot of executing an application using a flip indicator according to an embodiment of the present disclosure.

Referring to FIG. 13C, when a user input of selecting an object registered to a gallery application is detected, the processor 120 may provide a user interface 1350 related to a gallery. The user interface 1350 related to the gallery includes an execution screen of the gallery application and a flip indicator 1351 for executing a note (memo) application. When the flip indicator 1351 is selected, the processor 120 may provide a user interface 1355 related to a note. The user interface 1355 related to the note includes an execution screen of the note application and a flip indicator 1357 for executing the gallery application. When the flip indicator 1357 is selected, the processor 120 may display the user interface 1350 related to the gallery, and, when the flip indicator 1351 is selected, the processor 120 may display the user interface 1355 related to the note. The user may select a photo using the gallery application, and, when the user selects the flip indicator 1351, the user may write a note regarding the selected photo using the note application.

When a user input of selecting an object registered to a household accounts application is detected, the processor 120 may provide a user interface 1360 related to household accounts. The user interface 1360 related to the household accounts includes an execution screen of the household accounts application and a flip indicator 1361 for executing a calculator application. When the flip indicator 1361 is selected, the processor 120 may provide a user interface 1365 related to a calculator. The user interface 1365 related to the calculator includes an execution screen of the calculator application and a flip indicator 1367 for executing the household accounts application. When the flip indicator 1367 is selected, the processor 120 may display the user interface 1360 related to the household accounts, and, when the flip indicator 1361 is selected, the processor 120 may display the user interface 1365 related to the calculator. While managing household accounts using the household accounts application, the user may execute the calculator application by selecting the flip indicator 1361, and may calculate an amount of money regarding an expenditure (or deposit) item to be added to the household accounts. After calculating the amount of money using the calculator application, the user may execute the household accounts application by selecting the flip indicator 1367, and may add the calculated amount of money to the expenditure (or deposit) item.

Figure 14:
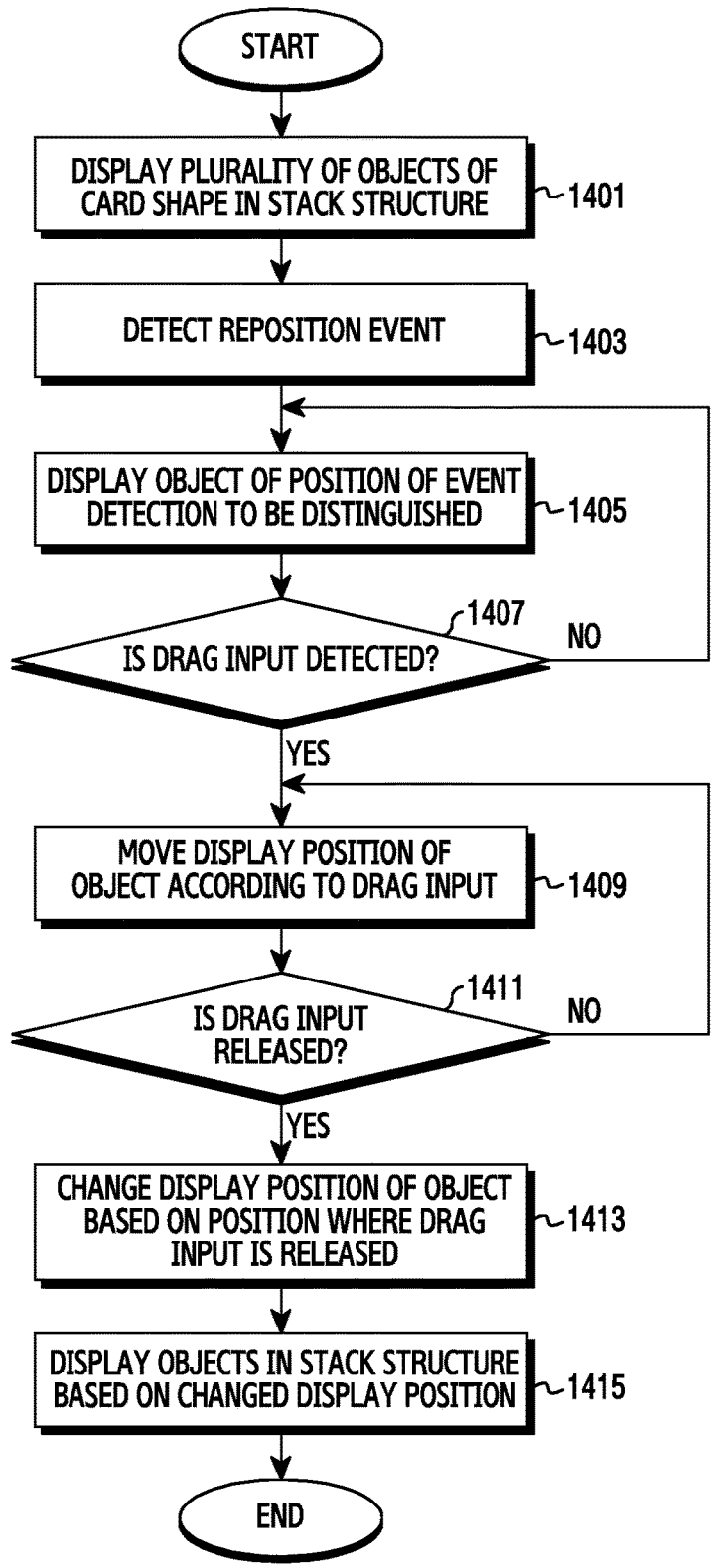
FIG. 14 is a flowchart of a method for changing a display position of an application in an electronic device according to an embodiment of the present disclosure.

FIG. 14 is a flowchart of a method for changing a display position of an application in an electronic device according to an embodiment of the present disclosure.

Referring to FIG. 14, in step 1401, the electronic device 101 (for example, the processor 120) displays a plurality of objects of a card shape in a stack structure. Since step 1401 is the same as or similar to step 401 of FIG. 4 or step 801 of FIG. 8, a detailed description thereof is omitted.

In step 1403, the electronic device 101 (for example, the processor 120) detects a reposition event. The reposition event may be a user input for changing a display position of an object. For example, the reposition event may be an input of selecting a reposition item in a menu item and selecting an object to change a display position. Alternatively, the reposition event may be an input of pressing and holding an object (for example, a long touch) to change a display position.

In step 1405, the electronic device 101 (for example, the processor 120) displays the object of the location where the event is detected to be distinguished from the other objects. For example, the processor 120 may display the object to change the display position differently from the other objects. For example, the processor 120 may display the object to change the display position by highlighting or may display the object to flicker. Alternatively, the processor 120 may shade the other objects except for the object to change the display position. Alternatively, the processor 120 may display all of the objects displayed on the display 160 to flicker or shake.

In step 1407, the electronic device 101 (for example, the processor 120) may determine whether a drag input is detected or not. The processor 120 may determine whether the drag input is detected or not while still holding the user input regarding the reposition event. That is, the user may touch the object and hold the touch, and then may drag (or move) without releasing the touch. Alternatively, the processor 120 may determine whether the drag input is detected or not after the user input regarding the reposition event is released. That is, the user may touch one object and hold the touch and then release the touch (for example, a first touch), and touch an object to change a display position and then drag (for example, a second touch).

When the drag input is detected in step 1407, the processor 120 performs step 1409, and, when the drag input is not detected, the processor 120 returns to step 1405.

When the drag input is detected (Yes in step 1407), the electronic device 101 (for example, the processor 120) moves the display position of the object according to the drag input in step 1409. For example, when the drag input is an input of moving up, the processor 120 may move the first object up. When the drag input is an input of moving down, the processor 120 may move the first object down.

The processor 120 may move the display position of the object according to the drag input, and display the object.

In step 1411, the electronic device 101 (for example, the processor 120) determines whether the drag input is released or not. The processor 120 may detect whether the drag input detected in step 1407 is released or not. When the drag input is released, the processor 120 may determine that moving the display position of the object is completed. Alternatively, when a done (or Ok) button is pressed after the reposition event is detected, the processor 120 may determine that moving the display position of the object is completed.

When the drag input is released, the processor 120 performs step 1413, and, when the drag input is not released, the processor 120 returns to step 1409.

In step 1413, the electronic device 101 (for example, the processor 120) changes the display position of the object based on the position where the drag input is released. For example, when the first object to the seventh object are displayed in order in step 1401, the user may select the first object and then drag, and move the first object to the display position of the fifth object. In this case, the processor 120 may change the display positions of the second object to the fifth object to the original positions of the first object to the fourth object, and may change the display position of the first object to the original position of the fifth object.

In step 1415, the electronic device 101 (for example, the processor 120) displays the objects in a stack structure based on the changed display positions. For example, the processor 120 may provide a user interface in which the display positions of the first object to the fifth object are changed from those in the user interface of step 1401.

Figure 15:
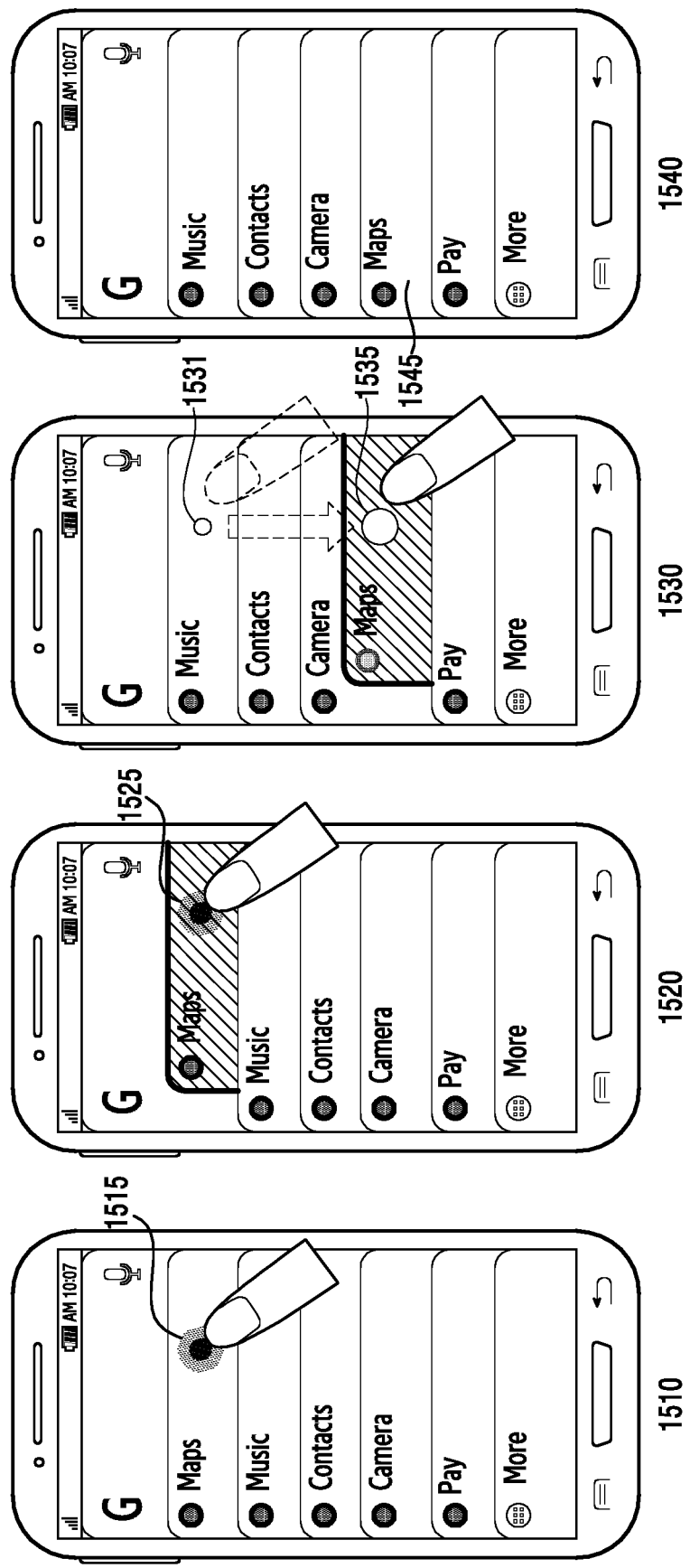
FIG. 15 illustrates screenshots of changing a display position of an application in an electronic device according to an embodiment of the present disclosure.

FIG. 15 illustrates screenshots of changing a display position of an application in an electronic device according to an embodiment of the present disclosure.

Referring to FIG. 15, the processor 120 may provide a first user interface 1510 displaying a plurality of objects of a card shape in a stack structure. The first user interface 1510 may include a first object (G), a second object (Maps), a third object (Music), a fourth object (Contacts), a fifth object (Camera), a sixth object (Pay), and a seventh object (More). The processor 120 may detect a reposition event 1515 on the second object (Maps). When the reposition event is detected, the processor 120 may provide a second user interface 1520. The second user interface 1520 may display the second object (Maps) where the reposition event is detected to be distinguished from the other objects. For example, the second user interface 1520 may display the second object (Maps) differently from the other objects (for example, G, Music, Contacts, Camera, and the like). The processor 120 may highlight the second object (Maps). The processor 120 may detect an input 1525 of dragging the second object (Maps) in the second user interface 1520.

When the input of dragging the second object (Maps) is detected, the processor 120 may provide a third user interface 1530. On the third user interface 1530, the display position of the second object (Maps) may be changed according to a drag input (for example, 1531, 1535). For example, the user may drag from the first position 1531 to the second position 1535 while still touching the second object (Maps). In response to the display positions of the second object (Maps) being changed, the processor 120 may change the display positions of the other objects. The processor 120 may move the second object (Maps) to the original position of the fifth object (Camera), move the third object (Music) to the original position of the second object (Maps), and move the fourth object (Contacts) and the fifth object (Camera) to the original positions of the third object (Music) and the fourth object (Contacts). The display positions of the sixth object (Pay) and the seventh object (More) may not be changed.

When the drag input on the second object (Maps) is released, the processor 120 may provide a fourth user interface 1540. On the fourth user interface 1540, the second object 1545 (Maps) in the first user interface 1510 is changed to the display position of the fifth object (Camera), and the third object (Music) to the fifth object (Camera) are changed to the display positions of the second object (Maps) to the fourth object (Contacts). When the done (or Ok) button is selected in the third user interface 1530, the processor 120 may provide the fourth user interface 1540.

Figure 16:
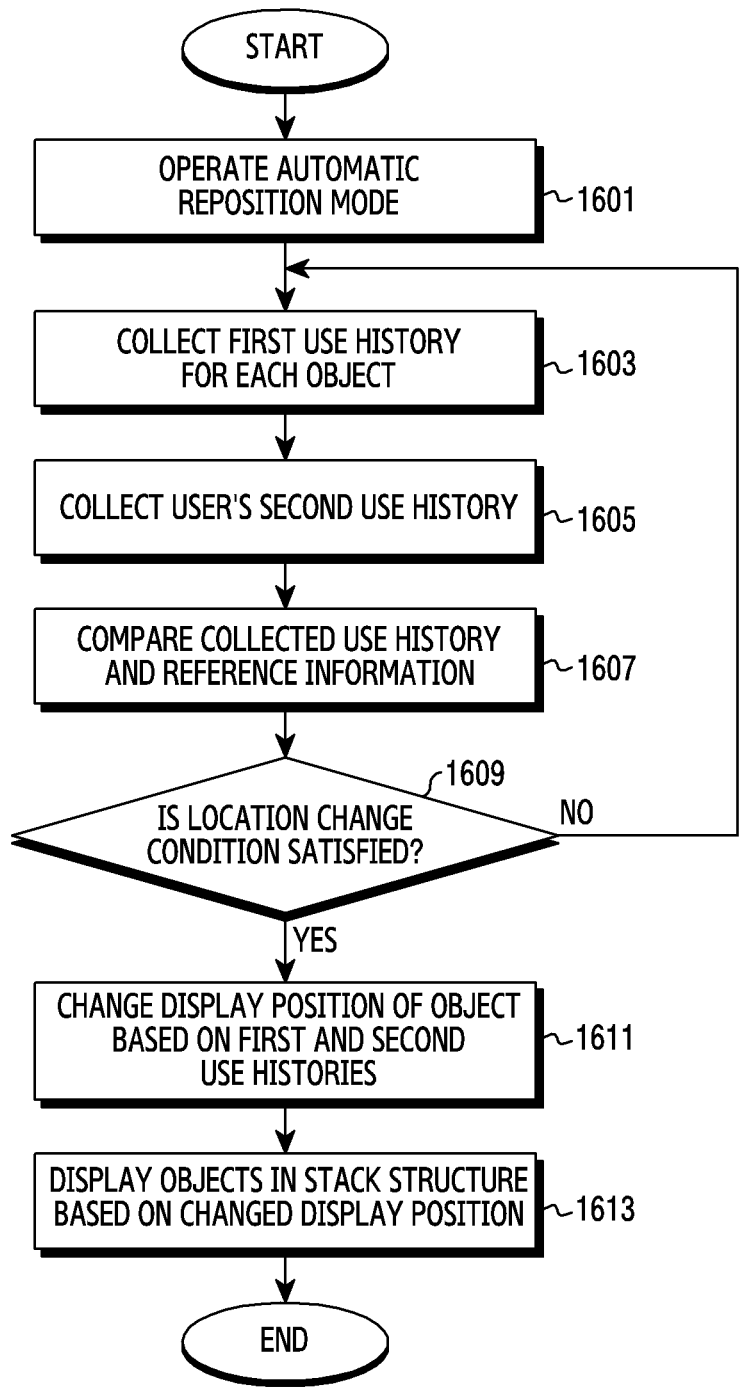
FIG. 16 is a flowchart of a method for changing a display position of an application based on a use history in an electronic device according to an embodiment of the present disclosure.

FIG. 16 is a flowchart of a method for changing a display position of an application based on a use history in an electronic device according to an embodiment of the present disclosure.

Referring to FIG. 16, the electronic device 101 (for example, the processor 120) performs an automatic reposition mode operation in step 1601. The automatic reposition mode may be a mode in which a display position of an application is changed on a real time basis or periodically (for example, on a daily basis, a weekly basis, or on a monthly basis) based on a user's use history. When the automatic reposition mode is switched on, the processor 120 may operate in the automatic reposition mode. The user may switch on the automatic reposition mode in a menu item in a user interface which displays a plurality of objects of a card shape in a stack structure. Alternatively, the processor 120 may receive a setting for switching on the automatic reposition mode in a home screen (for example, 710, 720) from the user.

In step 1603, the electronic device 101 (for example, the processor 120) collects a first use history for each object. The first use history may include at least one of the number of times of using an object, a time of use, and a period of use. The processor 120 may collect the first use history on a real time basis or periodically.

In step 1605, the electronic device 101 (for example, the processor 120) collects a user's second use history. The second use history may be at least one of a touch position, the number of times of touching, a touch direction, and user's settings. For example, the user's settings may place the most frequently used object at the center, the first position, or the second position of the plurality of objects. The user's settings may be set by the user or may be set by the processor 120 based on the touch position. The processor 120 may collect the second use history on a real time basis or periodically.

In step 1607, the electronic device 101 (for example, the processor 120) compares the collected use history and reference information. The collected use history may include the first use history and the second use history. The reference information may include a condition for changing a display position of an object. The reference information may be set by the user or may be set by the processor 120.

In step 1609, the electronic device 101 (for example, the processor 120) determines whether the collected use history satisfies the location change condition or not. For example, the location change condition may be for placing the most frequently used object at the center of the plurality of objects. When the first object to the seventh object are displayed, the center of the objects may be the position of the third object or the fourth object. Alternatively, the location change condition may be for placing the most frequently used object at the first position of the plurality of objects.

When the first object to the seventh object are displayed in sequence, the first position may be the position of the first object.

For example, the processor 120 may identify the most frequently used object based on the first use history, and, when the identified object is not placed at the center of the objects based on the second use history, the processor 120 may determine that the location change condition is satisfied. For example, the processor 120 may identify the most frequently used object based on the first use history, and, when the identified object is not placed at the first position of the objects based on the second use history, the processor 120 may determine that the location change condition is satisfied.

The processor 120 performs step 1611 when the location change condition is satisfied, and returns to step 1603 when the location change condition is not satisfied.

When the location change condition is satisfied (Yes in step 1609), the electronic device 101 (for example, the processor 120) changes the display positions of objects based on the first and second use histories. For example, the processor 120 may change the display positions of the objects based on the first and second use histories as shown on the third user interface 1530 of FIG. 15.

In step 1613, the electronic device 101 (for example, the processor 120) displays the objects in a stack structure based on the changed display positions. For example, when the first user interface 1510 of FIG. 15 is displayed in step 1601, the processor 120 displays the fourth user interface 1540 of FIG. 15 in step 1613.

Figure 17:
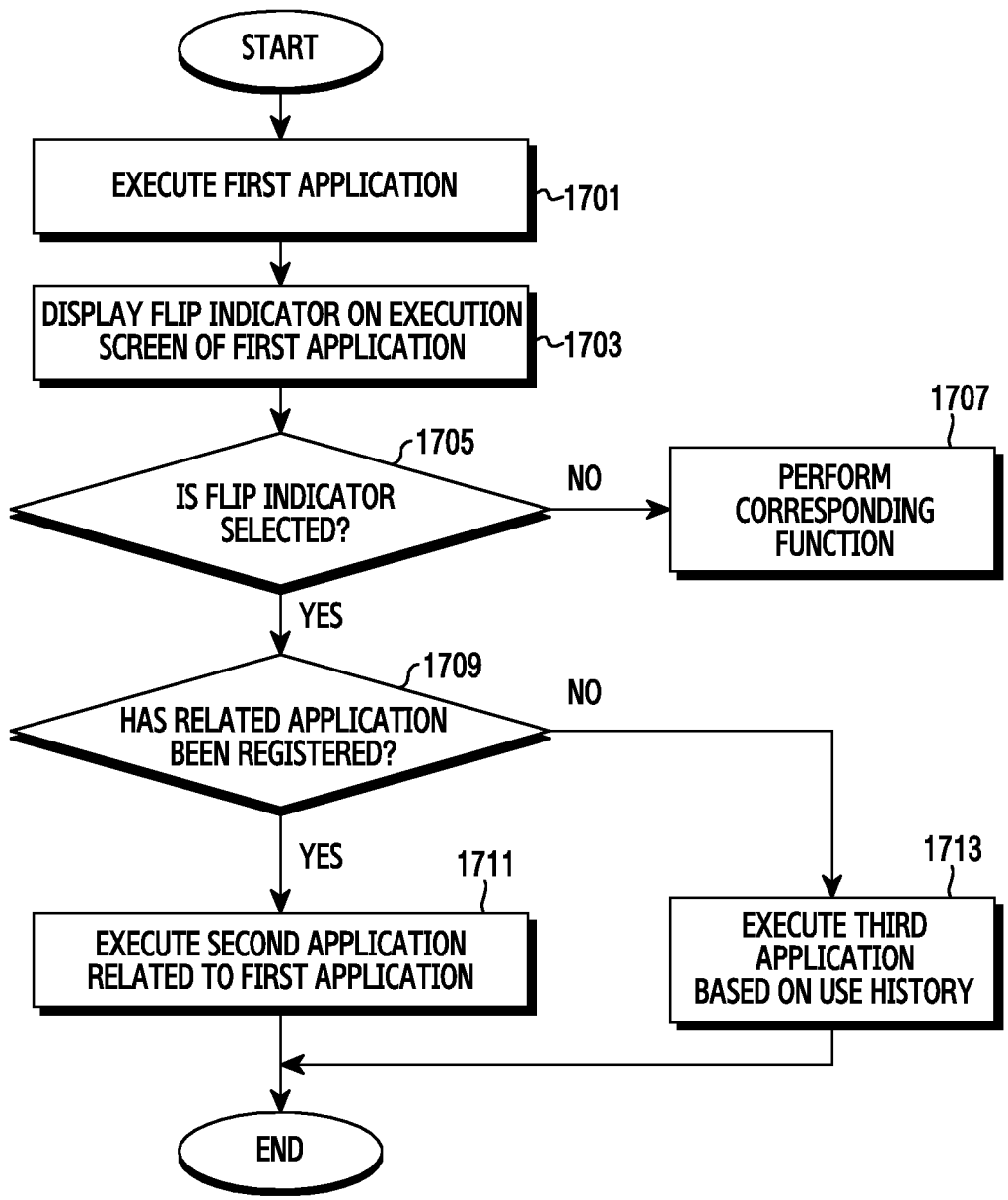
FIG. 17 is a flowchart of a method for providing a related application in an electronic device according to an embodiment of the present disclosure.

FIG. 17 is a flowchart of a method for providing a related application in an electronic device according to an embodiment of the present disclosure.

Referring to FIG. 17, in step 1701, the electronic device 101 (for example, the processor 120) executes a first application. Since step 1701 is the same as or similar to step 1201 of FIG. 12, a detailed description thereof is omitted.

In step 1703, the electronic device 101 (for example, the processor 120) displays a flip indicator on an execution screen of the first application. The flip indicator may be for executing an application different from the first application or another page of the first application. The execution screen of the first application may be displayed in the form a card. The processor 120 may display the flip indicator on a part of the execution screen of the first application.

In step 1705, the electronic device 101 (for example, the processor 120) detects whether the flip indicator is selected or not. For example, the processor 120 may determine whether a touch input on the flip indicator is detected or not. When the flip indicator is not selected, the processor 120 performs step 1707, and, when the flip indicator is selected, the processor 120 performs step 1709.

When the flip indicator is not selected (No in step 1705), the electronic device 101 (for example, the processor 120) performs a corresponding function in step 1707. The corresponding function may be a function which is performed according to a user input. For example, when a touch input on the first application is received from the user, the processor 120 may perform a function regarding the first application according to the received touch input.

When the flip indicator is selected (Yes in step 1705), the electronic device 101 (for example, the processor 120) determines whether a related application is registered or not in step 1709. The processor 120 may determine whether another application is registered by the user in connection with the first application. When the related application is registered, the processor 120 performs step 1711, and, when the related application is not registered, the processor 120 performs step 1713.

When the related application has been registered (Yes in step 1709), the electronic device 101 (for example, the processor 120) executes a second application related to the first application in step 1711. The second application may be an application which has been registered by the user in connection with the first application. The processor 120 may display a flip indicator on an execution screen of the second application.

When the related application has not been registered (No in step 1709), the electronic device 101 (for example, the processor 120) may execute a third application based on a use history in step 1713. The third application may be an application which is provided by the processor 120 based on a user's use history. For example, the second application and the third application may be the same or may be different from each other. The second application may be an application which is frequently used by the user while the first application is being executed. Accordingly, since the third application is provided based on the use history, the second application and the third application may be the same or may be different from each other. The processor 120 may display a flip indicator on an execution screen of the third application.

According to an embodiment of the present disclosure, the processor 120 may display the flip indicator displayed on the execution screen of the second application and the flip indicator displayed on the execution screen of the third application in the same form or in different forms. For example, the flip indicator displayed on the execution screen of the second application and the flip indicator displayed on the execution screen of the third application may be the same as an image related to the first application. The flip indicator displayed on the execution screen of the first application in step 1703 may be different according to whether step 1711 is performed or step 1713 is performed. For example, when step 1711 is performed, the flip indicator displayed on the execution screen of the first application may be an image related to the second application. When step 1713 is performed, the flip indicator displayed on the execution screen of the first application may be an empty image or an image related to the third application.

According to an embodiment of the present disclosure, a method for operating an electronic device includes displaying a plurality of objects in a stack structure, each object for executing at least one application, detecting a user input of selecting one object from among the plurality of objects, executing a first application corresponding to the selected object, displaying a flip indicator on an execution screen of the first application, and, when the flip indicator is selected, executing a second application.

The method further includes displaying a flip indicator on an execution screen of the second application, and, when the flip indicator is selected, switching to the execution screen of the first application.

Executing the second application includes, when the flip indicator is selected, determining whether an application is registered in connection with the first application, when the application is registered, executing the registered application, when the application is not registered, executing another application based on an attribute of the first application or a use history.

The method further includes, when the flip indicator is selected, displaying an execution screen which is different from the execution screen of the first application.

The method further includes detecting a reposition event, displaying an object at a position where the reposition event is detected to be distinguished, moving the display position of the object according to a drag input, and changing the display position of the object based on a position where the drag input is released.

The computer readable recording medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high level language codes, which may be executed in a computer by using an interpreter, as well as machine codes made by a compiler. The aforementioned hardware device may be configured to operate as one or more software modules in order to perform the operation of the present disclosure, and vice versa.

Any of the modules or programming modules according to an embodiment of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various embodiments disclosed herein are provided to describe technical details of the present disclosure and to help the understanding of the present disclosure, and do not limit the scope of the present disclosure. Therefore, it should be construed that all modifications and changes or modified and changed forms based on the technical idea of the present disclosure fall within the scope of the present disclosure as defined by the appended claims and their equivalents.

What is claimed is:

1. An electronic device comprising:
    a display;
    a processor electrically connected with the display; and
    a memory electrically connected with the processor,
    wherein, the memory is configured to store instructions that when executed cause the processor to:
        display a plurality of card objects, wherein each of the plurality of card objects has at least a part thereof overlapping with another card object, and wherein a first application and a second application among a plurality of applications of the electronic device are associated with at least one of the plurality of card objects;
        display, on a first card object, a first icon associated with the first application in a first area, and a second icon associated with the second application in a second area;
        detect a first input selecting the first card object,
        in response to the first input, display a first execution screen of the first application and display a flip indicator on the first execution screen of the first application;
        detect a second input on the flip indicator on the first execution screen of;
        in response to the second input, replace first execution screen of the first application with a second execution screen of the second application;
        display the flip indicator on the second execution screen of the second application;
        detect a third input on the flip indicator; and
        in response to the third input, replace the second execution screen of the second application with the first execution screen of the first application.

2. The electronic device of claim 1, wherein
    the instructions, when executed, cause the processor to execute one of the first application or the second application based on an attribute of the first input.

3. The electronic device of claim 1, wherein the instructions, when executed, cause the processor to switch from the second execution screen of the second application to the first execution screen of the first application in response to a fourth input to switch the second application while the second application is displayed.

4. The electronic device of claim 1, wherein the second application is related to the first application.

5. The electronic device of claim 1, wherein the instructions, when executed, cause the processor to execute a third application based on a use history.

6. The electronic device of claim 1, wherein the instructions, when executed, cause the processor to provide a list comprising at least one application based on an attribute of the first application or a use history when an object association event is detected.

7. The electronic device of claim 1, wherein the instructions, when executed, cause the processor to display an application related to the first application, which is distinguished from other applications, when an object association event is detected to associate the second application.

8. The electronic device of claim 1, wherein the instructions, when executed, cause the processor to, when a reposition event is detected, display an object of the reposition event, move a display position of the object of the reposition event according to a drag input, and change the display position of the object of the reposition event based on a position where the drag input is released.

9. The electronic device of claim 1, wherein the instructions, when executed, cause the processor to change a display position of each card object of the plurality of card objects, based on a first use history of each card object and a second use history of a user.

10. A method for operating an electronic device, the method comprising:
    displaying a plurality of card objects, wherein each of the plurality of card objects has at least a part thereof overlapping with another card object, and wherein a first application and a second application among a plurality of applications of the electronic device are associated with at least one of the plurality of card objects;
    displaying, on a first card object, a first icon associated with the first application in a first area, and a second icon associated with the second application in a second area;
    detecting a first input selecting the first card object;
    in response to the first input displaying a first execution screen of the first application and displaying a flip indicator on the first execution screen of the first application;
    detecting a second input on the flip indicator on the first execution screen of the first application;
    in response to the second input, replacing the first execution screen of the first application with a second execution screen of the second application;
    displaying the flip indicator on the second execution screen of the second application;
    detecting a third input on the flip indicator; and in response to third input, replace the second execution screen of the second application with the first execution screen of the first application.

11. The method of claim 10, further comprising:

detecting a reposition event;

displaying an object of the reposition event;

moving the display position of the object of the reposition event according to a drag input; and changing the display position of the object of the reposition event based on a position where the drag input is released.

* * * * *